United States Patent
Gyurec et al.

(10) Patent No.: US 10,718,588 B2
(45) Date of Patent: Jul. 21, 2020

(54) EXTENSION FOR A BIPOD SUPPORT GUN SUPPORT

(71) Applicant: Accuracy Solutions, LLC, Corona, CA (US)

(72) Inventors: Ernesto Daniel Gyurec, Santa Ana, CA (US); Eduardo Abril de Fontcuberta, Madrid (ES)

(73) Assignee: Accuracy Solutions, LLC., Corona, CA (US)

( * ) Notice: Subject to any disclaimer, the term of this patent is extended or adjusted under 35 U.S.C. 154(b) by 0 days.

(21) Appl. No.: 15/955,518

(22) Filed: Apr. 17, 2018

(65) Prior Publication Data

US 2019/0063861 A1 Feb. 28, 2019

Related U.S. Application Data

(63) Continuation-in-part of application No. PCT/US2017/049754, filed on Aug. 31, 2017.

(51) Int. Cl.
| | |
|---|---|
| *F41A 23/10* | (2006.01) |
| *F41A 23/02* | (2006.01) |
| *F16B 7/14* | (2006.01) |
| *F16M 11/26* | (2006.01) |

(52) U.S. Cl.
CPC ............ *F41A 23/10* (2013.01); *F16B 7/1454* (2013.01); *F16M 11/26* (2013.01); *F41A 23/02* (2013.01)

(58) Field of Classification Search
CPC ........ F41A 23/10; F41A 23/02; F16B 7/1454; F16M 11/26
See application file for complete search history.

(56) References Cited

U.S. PATENT DOCUMENTS

| | | | | |
|---|---|---|---|---|
| 2,420,267 A | * | 5/1947 | Sefried | F41A 23/08 42/94 |
| 3,327,422 A | * | 6/1967 | Harris | F41A 23/08 42/94 |
| 3,656,399 A | * | 4/1972 | Hill | F42B 12/68 89/1.34 |
| 4,026,057 A | * | 5/1977 | Cady | F41A 23/16 42/94 |
| 4,345,398 A | * | 8/1982 | Pickett | F41A 23/06 42/94 |
| 4,351,224 A | * | 9/1982 | Curtis | F41A 23/08 42/94 |
| 4,393,614 A | * | 7/1983 | Pickett | F41A 23/06 42/94 |

(Continued)

*Primary Examiner* — Michelle Clement
(74) *Attorney, Agent, or Firm* — Marcus C. Dawes; Daniel L. Dawes

(57) ABSTRACT

An extension system is disclosed for a gun support attached to a gun having a barrel with an effective muzzle. The extension system includes: a fore-end attached to the gun adjacent to the barrel; a telescopic assembly having a proximal end and a distal end, the proximal end telescopically coupled to the fore-end, the distal end coupled to the gun support, where the telescopic assembly includes one or more telescopic portions; one or more clamps to selectively fix the first telescopic portions to the fore-end to provide an adjustable length of the telescopic assembly, which is then capable of positioning the gun support at or ahead of the effective muzzle and adjacent to the barrel as provided by the fore-end.

20 Claims, 24 Drawing Sheets

(56) References Cited

U.S. PATENT DOCUMENTS

| | | | | |
|---|---|---|---|---|
| 4,625,620 A * | 12/1986 | Harris | F41A 23/08 | 42/94 |
| 5,029,407 A * | 7/1991 | Kirkpatrick | F41A 23/10 | 42/94 |
| 5,194,678 A * | 3/1993 | Kramer | F16M 11/16 | 42/94 |
| 5,345,706 A * | 9/1994 | Brown | F41A 23/06 | 42/94 |
| 5,711,103 A * | 1/1998 | Keng | F41A 23/08 | 42/94 |
| 6,289,622 B1 * | 9/2001 | Desch, Jr. | F41A 23/10 | 42/94 |
| 6,763,627 B1 * | 7/2004 | Kaempe | F41A 23/10 | 42/94 |
| 6,834,454 B2 * | 12/2004 | Klein | F41A 23/18 | 211/4 |
| 6,877,266 B1 * | 4/2005 | Brownlee | F41A 23/16 | 42/90 |
| 6,935,064 B1 * | 8/2005 | Thompson | F41A 23/34 | 248/176.1 |
| 7,406,794 B1 * | 8/2008 | Pope, Jr. | F41A 23/16 | 42/94 |
| 7,614,174 B1 * | 11/2009 | Beltz | F41A 23/10 | 42/72 |
| 7,676,977 B1 * | 3/2010 | Cahill | F16M 11/16 | 248/168 |
| 7,770,320 B1 * | 8/2010 | Bartak | F41C 23/16 | 42/72 |
| 7,992,339 B2 * | 8/2011 | Hinds, Jr. | F41A 23/10 | 42/94 |
| 8,291,633 B1 * | 10/2012 | Hass | F41A 23/10 | 42/72 |
| 9,784,521 B2 * | 10/2017 | Bartak | F41A 23/10 | |
| 10,012,465 B1 * | 7/2018 | Liechty | F41A 23/10 | |
| 2006/0248774 A1 * | 11/2006 | Pierce | F41A 23/10 | 42/94 |
| 2006/0278797 A1 * | 12/2006 | Keng | F41A 23/10 | 248/440.1 |
| 2007/0094911 A1 * | 5/2007 | Rush | F16M 11/16 | 42/85 |
| 2007/0169391 A1 * | 7/2007 | Carpenter | F41A 23/14 | 42/94 |
| 2008/0307689 A1 * | 12/2008 | Dotson | F41A 23/06 | 42/94 |
| 2009/0000175 A1 * | 1/2009 | Potterfield | F41A 23/10 | 42/94 |
| 2009/0064559 A1 * | 3/2009 | Potterfield | F41A 23/08 | 42/94 |
| 2009/0126250 A1 * | 5/2009 | Keng | F41A 23/10 | 42/94 |
| 2010/0192449 A1 * | 8/2010 | Hinds, Jr. | F41A 23/10 | 42/94 |
| 2010/0218411 A1 * | 9/2010 | Keng | F41A 23/10 | 42/94 |
| 2011/0126444 A1 * | 6/2011 | Keng | F41A 23/10 | 42/94 |
| 2011/0265366 A1 * | 11/2011 | Hinds, Jr. | F41A 23/08 | 42/94 |
| 2012/0186126 A1 * | 7/2012 | Bartak | F41A 23/18 | 42/94 |
| 2012/0266513 A1 * | 10/2012 | Gnesda | F41A 23/08 | 42/72 |
| 2013/0036647 A1 * | 2/2013 | Chvala | F41A 23/10 | 42/94 |
| 2013/0174463 A1 * | 7/2013 | Hinds | F41A 23/04 | 42/94 |
| 2014/0041273 A1 * | 2/2014 | Masters | F41C 23/16 | 42/71.01 |
| 2014/0115940 A1 * | 5/2014 | Bonelli | F16M 11/14 | 42/94 |
| 2014/0190059 A1 * | 7/2014 | Ballard | F41C 23/16 | 42/94 |
| 2015/0121741 A1 * | 5/2015 | Bowman | F41A 23/10 | 42/94 |
| 2015/0362278 A1 * | 12/2015 | Genchel | F41A 23/10 | 42/94 |
| 2016/0054090 A1 * | 2/2016 | Nettleton | F41A 23/10 | 124/86 |
| 2016/0238336 A1 * | 8/2016 | Bartak | F41A 23/10 | |
| 2016/0273863 A1 * | 9/2016 | Hayes | F41A 23/08 | |
| 2017/0167817 A1 * | 6/2017 | Hayes | F41A 23/10 | |
| 2017/0205180 A1 * | 7/2017 | Ding | F41A 23/02 | |
| 2018/0058794 A1 * | 3/2018 | Scalf | F41A 23/10 | |
| 2018/0180375 A1 * | 6/2018 | Macken | F16M 11/26 | |
| 2018/0224062 A1 * | 8/2018 | Yokiel | F41A 23/06 | |
| 2018/0259287 A1 * | 9/2018 | Palu | F41A 23/10 | |
| 2019/0041156 A1 * | 2/2019 | Beachli | F41A 23/10 | |
| 2019/0063861 A1 * | 2/2019 | Gyurec | F16B 7/1454 | |
| 2019/0072355 A1 * | 3/2019 | Pop | F41A 23/10 | |
| 2019/0154394 A1 * | 5/2019 | Eccleshall | F41A 23/10 | |

\* cited by examiner

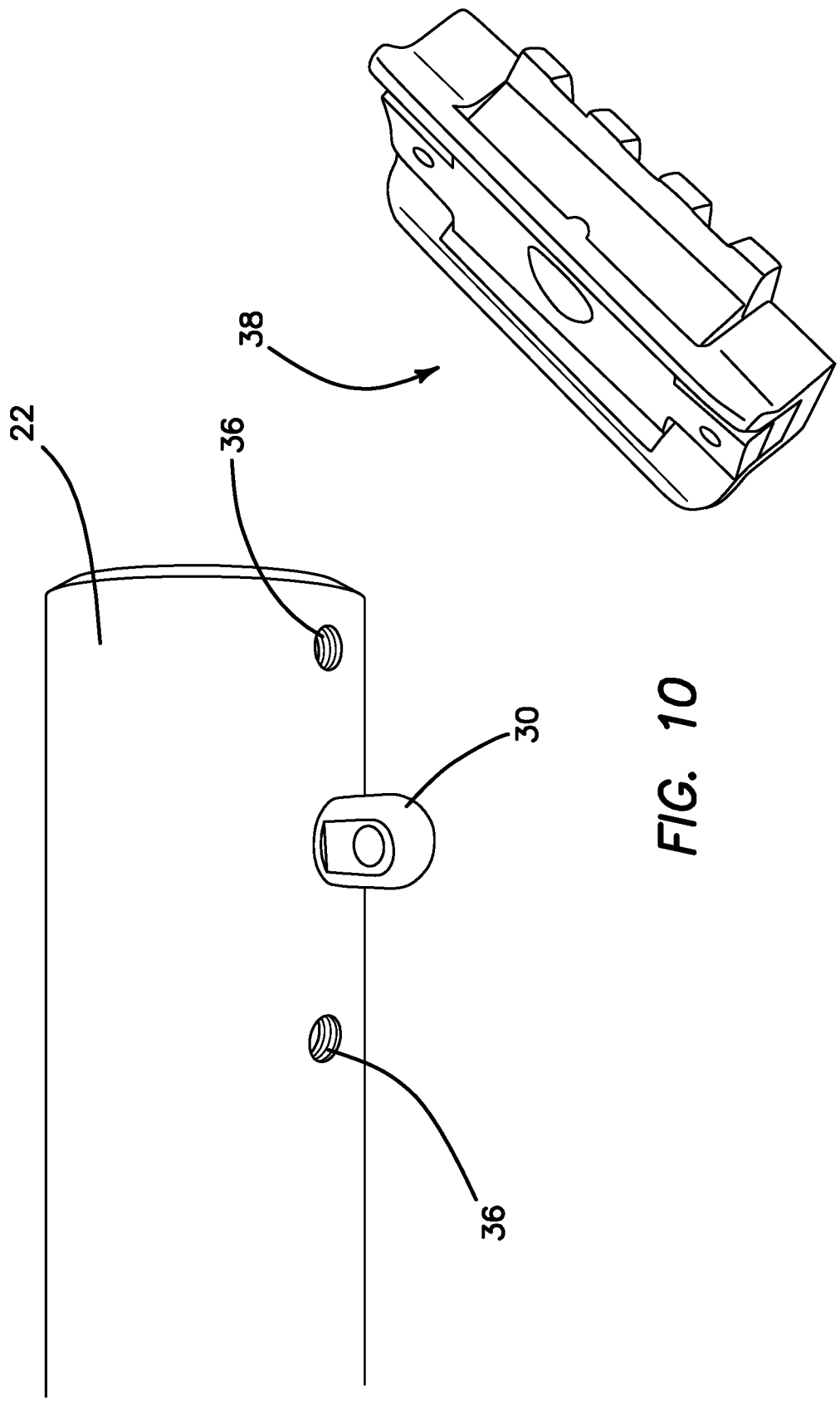

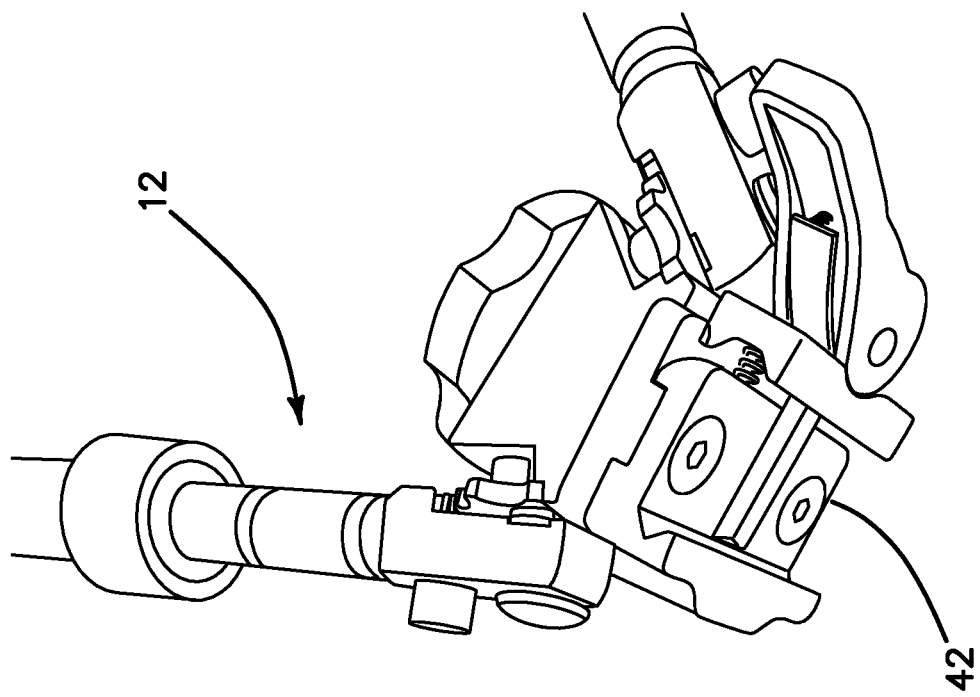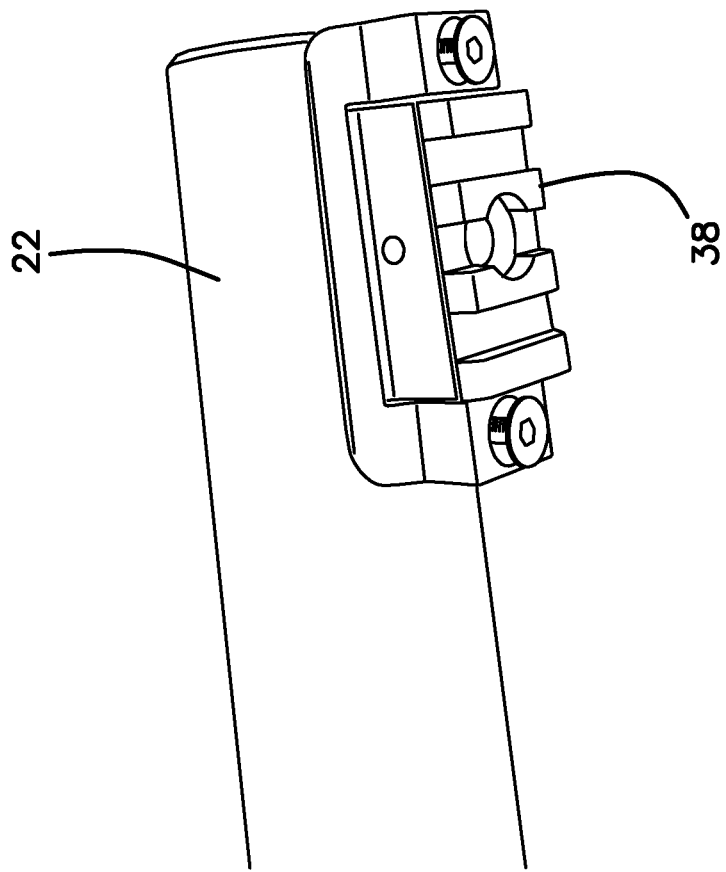
FIG. 12

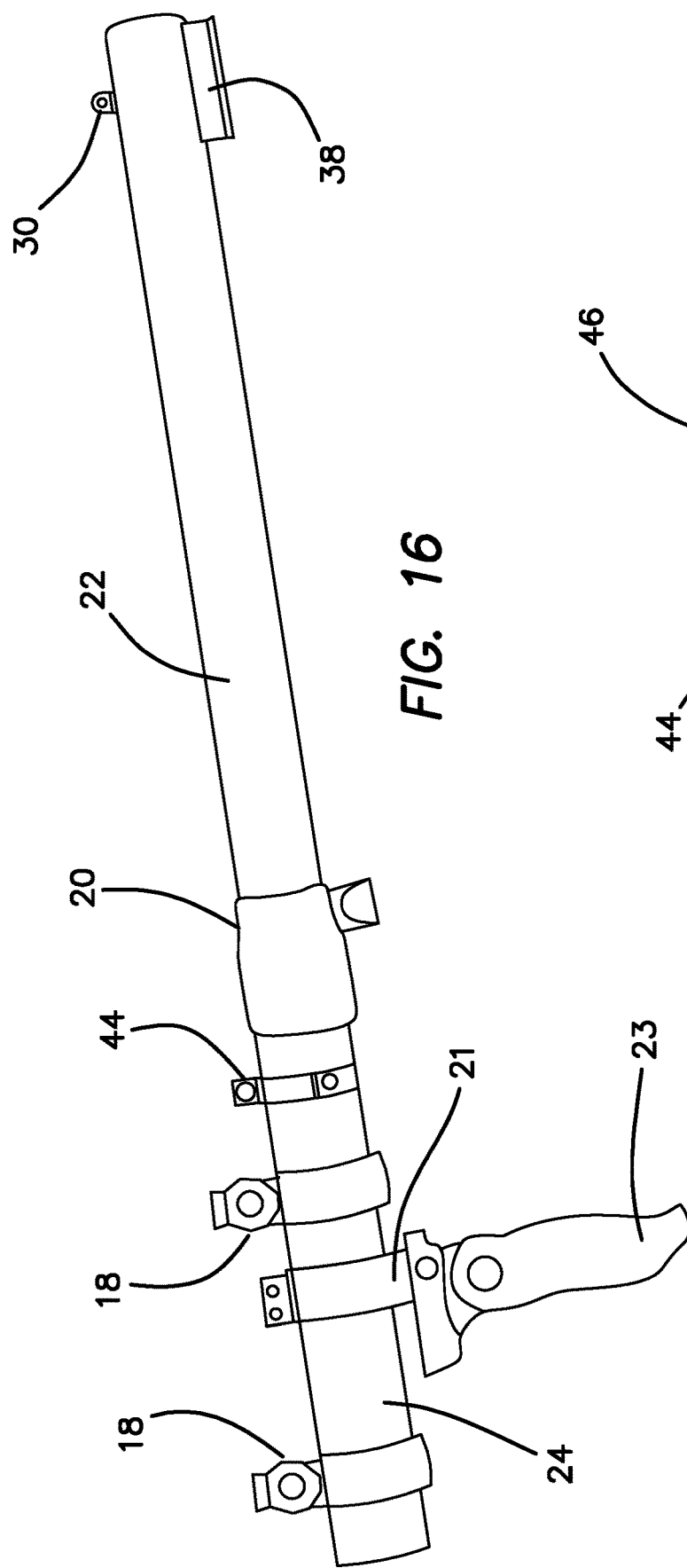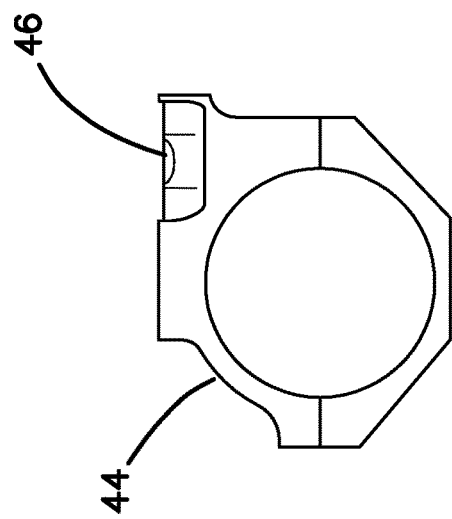

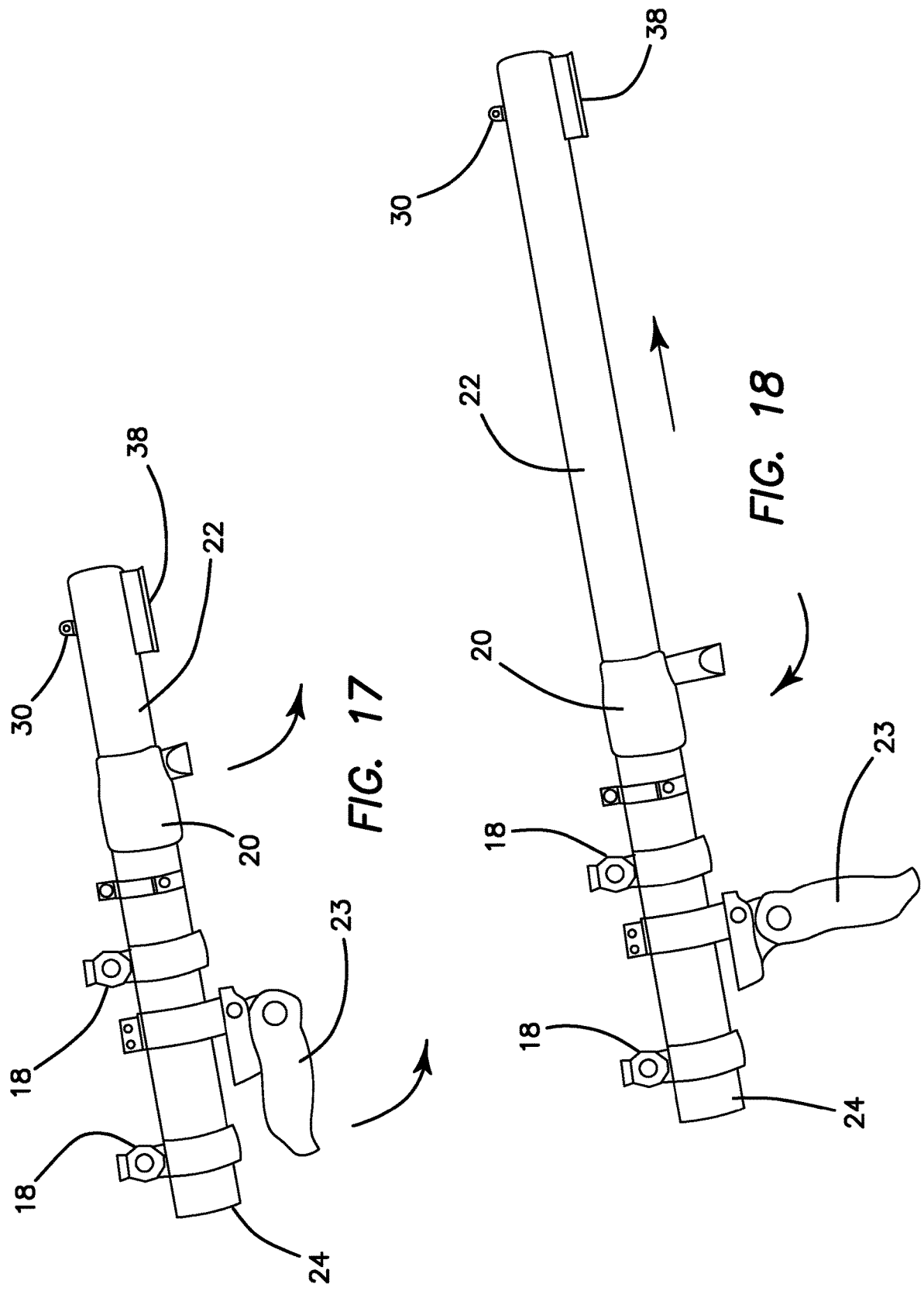

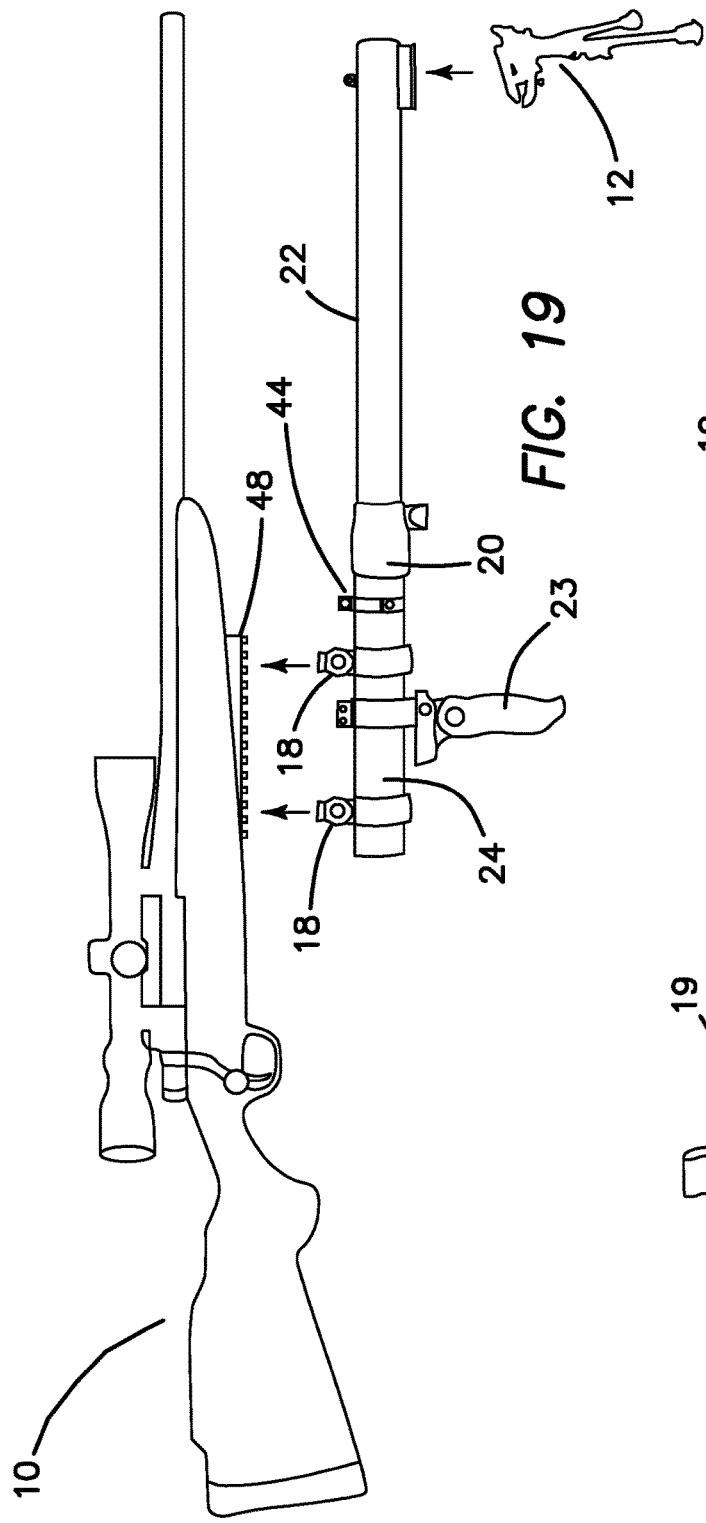
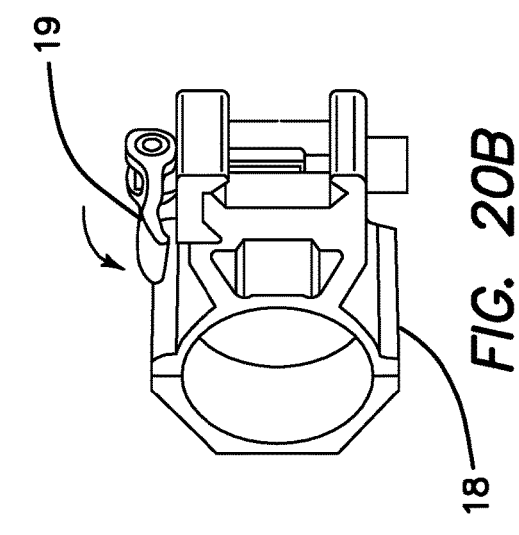
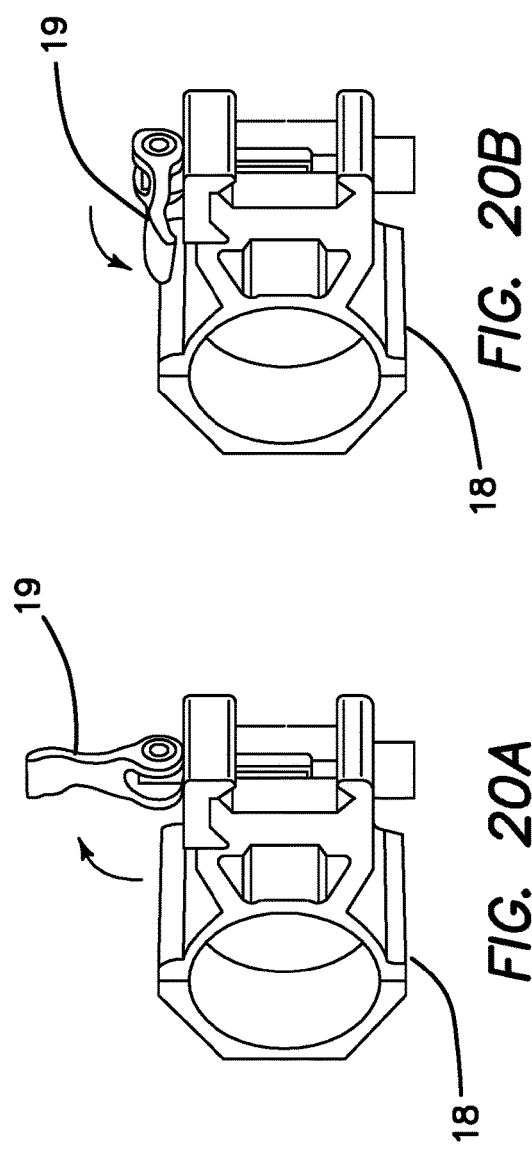

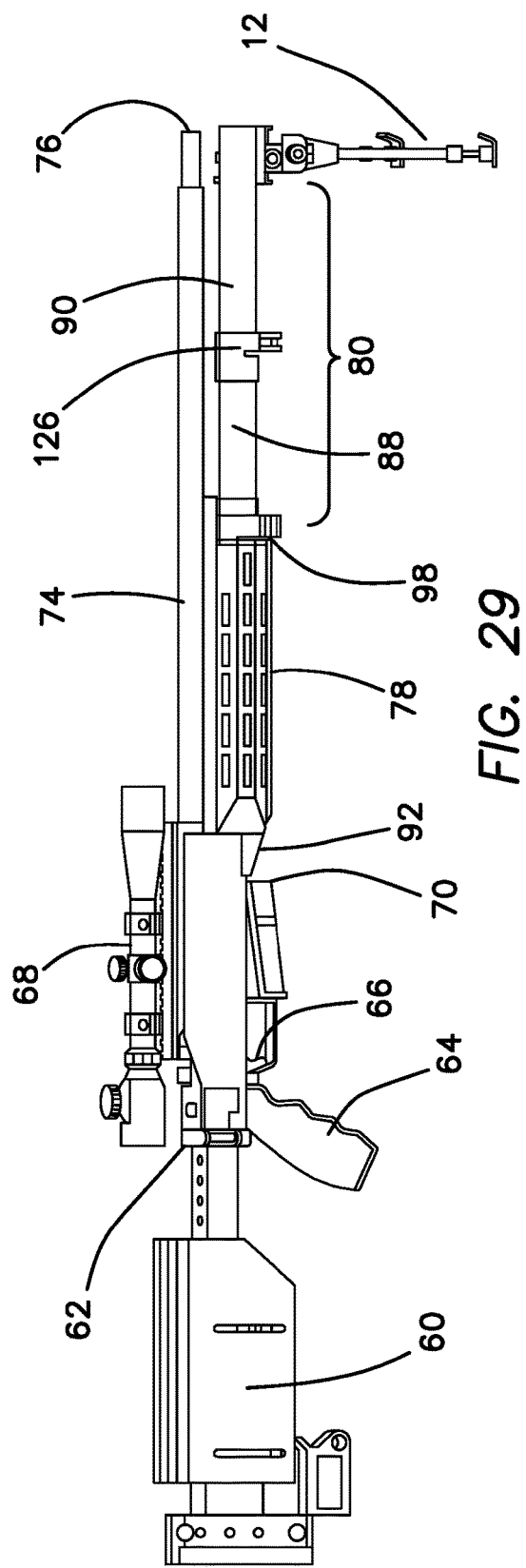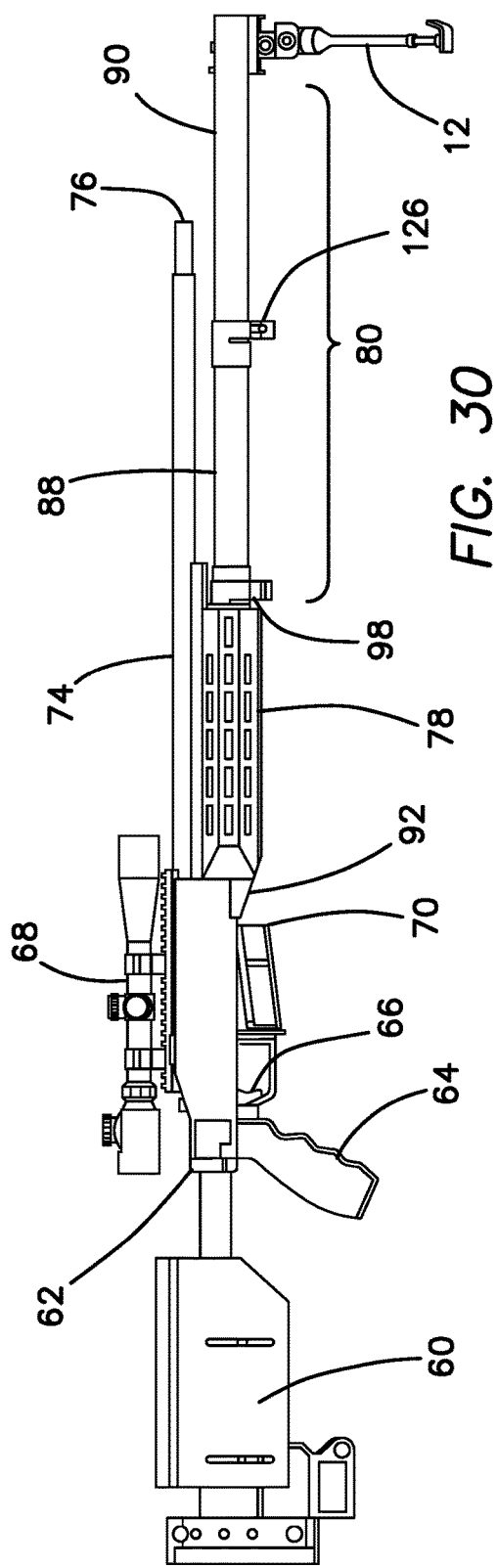

EXTENSION FOR A BIPOD SUPPORT GUN SUPPORT

RELATED APPLICATIONS

The present application is a continuation in part application of PCT application Ser. No. PCT/US17/49754, filed on Aug. 31, 2017, which in turn was related to U.S. Provisional Patent Application, Ser. No. 62/382,568, filed on Sep. 1, 2016, which are incorporated herein by reference and to which priority is claimed pursuant to 35 USC 120.

BACKGROUND

Field of the Technology

The invention relates to the field of mountings of firearms including locking means between gun and mounting, mountings without wheels (conventional mono- bi- or tripods, test mounts and bench rests), such as found in CPC F41A 23/10.

Description of the Prior Art

Rifle supports, such as bipods, have long been used to steady the muzzle of a rifle or shotgun during the firing thereof in an effort to "stabilize" the weapon to increase the shooter's accuracy. If the bipod is directly attached to the barrel of the gun, the harmonics of the barrel during the firing are materially affected by the bipod. Interfering with the harmonics of the barrel unpredictably alters the projectile's exit from the muzzle causing irregularities in the final trajectory of the projectile. If the bipod is mounted further back, on the gun stock, the harmonics of the barrel during firing is not affected, but the lever arm between the point of bipod attachment to the toe of the stock and the muzzle leads to a mechanically amplified displacement of the muzzle orientation for any unintended biological input or unintended movement during aiming or firing, materially affecting the accuracy of the rifle system as operated by the shooter. Accuracy of aiming and firing depends not only on the angular orientation in space of the gun barrel, but also on the stability of the gun muzzle position in space and the ability of the shooter to minimize the effects of biological input and unintended movement on the above mention components as a whole.

What is needed is some kind of accessory that can be used with bipod or tripod gun supports or rests that do not interfere with barrel harmonics during firing, but are also not subject to mechanically amplified barrel misalignments or biologically induced aiming errors.

BRIEF SUMMARY

The illustrated embodiments of the invention include an extension system for a gun support attached to a gun, the gun having a barrel with an effective muzzle. The extension system includes: a fore-end attached to the gun adjacent to the barrel, a telescopic assembly having a proximal end and a distal end, the proximal end telescopically coupled to the fore-end, the distal end coupled to the gun support, where the telescopic assembly includes a first telescopic portion; and a first clamp to selectively fix the first telescopic portion to the fore-end to provide an adjustable length of the telescopic assembly, which is then capable of positioning the gun support at or in the proximity of the effective muzzle and adjacent to the barrel as provided by the fore-end.

In another embodiment the extension system further includes a second telescopic portion of the telescopic assembly, which second telescopic portion is telescopically engaged with the first telescopic portion; and a second clamp for selectively fixing the relative position of the second telescopic portion.

The first clamp is a toggle clamp and is fixed to the fore-end. Each of the first and second clamps is a toggle clamp.

The first and second telescopic portions are cylindrical and are hollow carbon fiber tubes.

The fore-end and the telescopic assembly disposed therein form a structure that is parallel and positioned closely to the barrel of the gun to aid with the management of the recoil effect of the gun during firing.

The fore-end is fixed to the gun and a proximal end of the telescopic assembly is comprised of the first telescopic portion telescopically disposed into the fore-end, where the second telescopic portion is nested with and freely rotatable relative to the first telescopic portion, and where the first clamp is a releasable clamp for selectively fixing the first telescopic extension, the relative angular orientation of the first and second telescopic portions being rotationally adjustable with respect to each other so that canting of the gun and adjustability of aiming of the canted gun is allowed from within a final firing position.

The extension system further includes in one embodiment a bubble level adjustably coupled to the extension system to provide an indication of horizontal alignment of the gun.

In a further embodiment the extension system includes two attachment fittings for possibly two corresponding gun supports to the distal end of the telescopic assembly, the distal end of the telescopic assembly being selectively rotatable relative to the gun to selectively position one of the possible two gun supports in an operative configuration.

The attachment fitting for one gun support is a sling swivel stud mounting screw coupled to a distal end of the telescopic assembly and the other one of the two attachment fittings for one gun support is an accessory mounting system diametrically opposite from sling swivel stud mounting screw, the gun support being coupled to a distal end of the telescopic assembly by coupling to either the sling swivel stud mounting screw or accessory mounting system, the distal end of the telescopic assembly being rotatable to orient the sling swivel stud mounting screw or accessory mounting system into a configuration for operative coupling to the gun support.

The possible two gun supports are attached on opposite sides of the distal end of the telescopic assembly to allow positioning of either one of the possible two gun supports in an operative configuration by an approximate 180° rotation of the distal end of the telescopic assembly.

The fore-end includes at least one accessory mounting system combined therein. For example, the accessory mounting system is a modular locking system (M-LOK), an open channel adjacent to the barrel and having a plurality of bores defined therein to allow accessories to be attached thereto and/or a rail defined in the fore-end.

The fore-end is formed as a prismatic multifaceted body or prismatic octagon with a corresponding plurality of longitudinal surfaces into or onto which a plurality of accessory mounting systems may be provided. The fore-end can also be formed with a round, elliptic or other prismatic multifaceted bodies, such as a hexagon.

In yet another embodiment the extension system includes a sling swivel stud mounting screw coupled to a distal end of the telescopic assembly with the gun support coupled to the distal end of the telescopic assembly by coupling to the sling swivel stud mounting screw.

Perturbations in the angular orientation of the barrel give rise to a potential error in the trajectory of the projectile after firing referred to as a cone of fire. The first clamp selectively fixes the first telescopic portion to the fore-end to provide an adjustable length of the telescopic assembly, which is then capable of positioning the gun support proximate to the effective muzzle or in front of the effective muzzle to reduce the effect of biological input or unintended movement on the system which leads to a statistical reduction of the cone of fire. The illustrated embodiments also include a method of aiming and/or firing a gun using the extension system of any one of the above embodiments.

While the apparatus and method has or will be described for the sake of grammatical fluidity with functional explanations, it is to be expressly understood that the claims, unless expressly formulated under 35 USC 112, are not to be construed as necessarily limited in any way by the construction of "means" or "steps" limitations, but are to be accorded the full scope of the meaning and equivalents of the definition provided by the claims under the judicial doctrine of equivalents, and in the case where the claims are expressly formulated under 35 USC 112 are to be accorded full statutory equivalents under 35 USC 112. The disclosure can be better visualized by turning now to the following drawings wherein like elements are referenced by like numerals.

BRIEF DESCRIPTION OF THE DRAWINGS

FIG. 10 is a partial bottom elevational view of the distal end portion of the extension system of the illustrated embodiments shown in enlarged view depicting the installed mounting screw and a Picatinny rail bipod supporting block shown as detached in perspective view.

FIG. 12 is a partial bottom elevational view of the distal end portion of the extension system of the illustrated embodiments shown in enlarged view depicting the installed bipod supporting block with the mating mounting fixture of the bipod support shown as detached.

FIG. 16 is a side plan view of the embodiment of the extension system shown in isolation from the gun with a folding forward grip and a short distal Picatinny rail.

FIG. 17 is a side plan view of an embodiment of FIG. 16 shown in a collapsed configuration.

FIG. 18 is a side plan view of an embodiment of FIG. 16 shown in an extended configuration.

FIG. 19 is a side plan view of an embodiment of FIG. 16 in exploded view being mounted to a gun using a tilted Picatinny rail and a bipod.

FIG. 20a is a perspective view of the quick detach lever in an unlocked configuration.

FIG. 20b is a perspective view of the quick detach lever in a locked configuration.

FIG. 21 is a side plan view of a bubble level attachable to the extension system.

FIG. 29 is a side elevational view of the gun of FIG. 28 in which the telescopic bipod extension has been partially deployed from the fore-end of the gun to place the bipod support at or near the muzzle of the gun.

FIG. 30 is a side elevational view of the gun of FIG. 28 in which the telescopic bipod extension has been fully deployed from the fore-end of the gun to place the bipod support in front of the muzzle of the gun.

The disclosure and its various embodiments can now be better understood by turning to the following detailed description of the preferred embodiments which are presented as illustrated examples of the embodiments defined in the claims. It is expressly understood that the embodiments as defined by the claims may be broader than the illustrated embodiments described below.

DETAILED DESCRIPTION OF THE PREFERRED EMBODIMENTS

Figure 1:
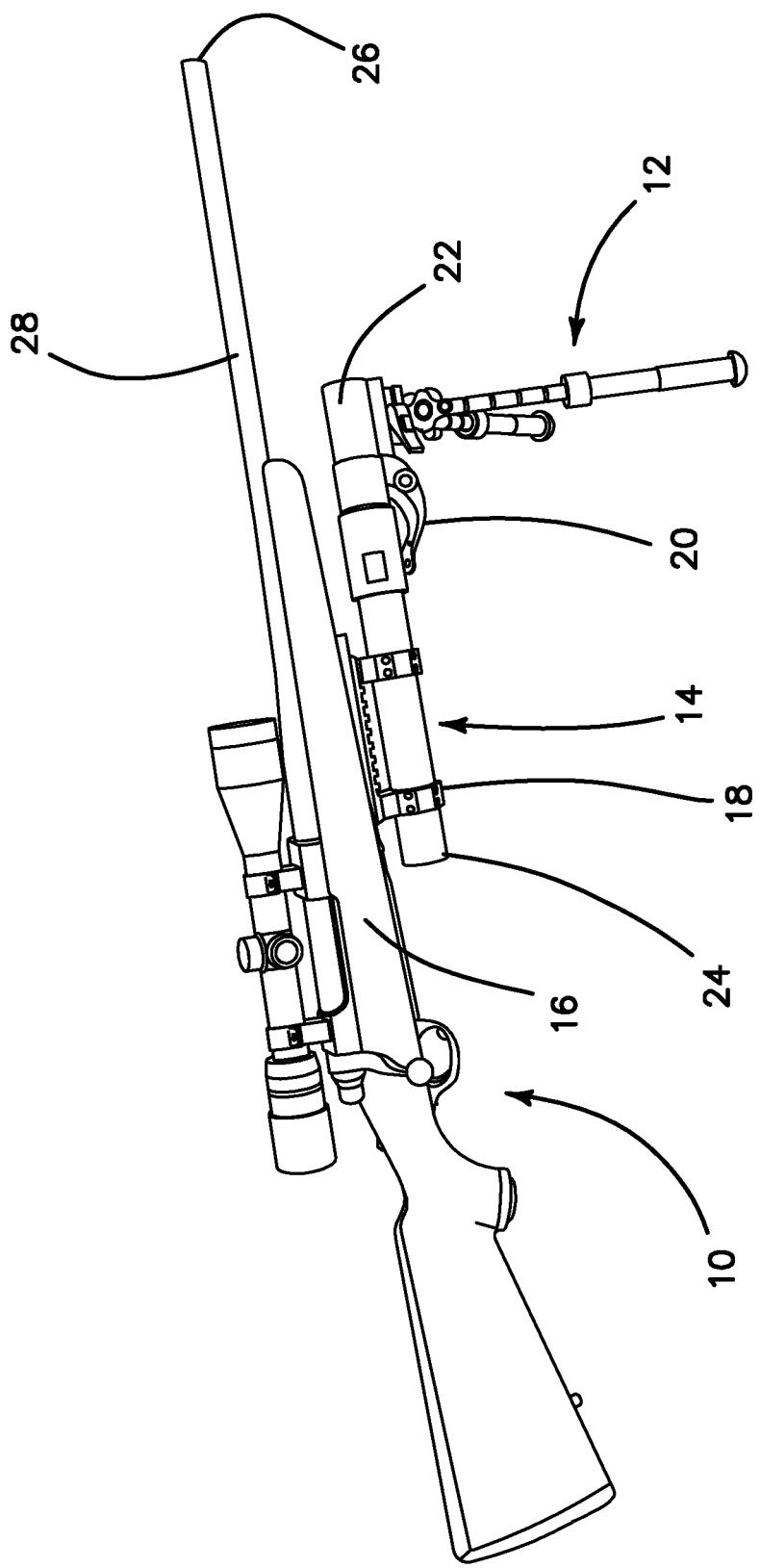
FIG. 1 is a side elevational view of a rifle with a bipod support extension system attached to the stock's distal end of the gun using the extension of the illustrated embodiments shown in a contracted or shortened configuration.

FIG. 1 is a side elevational view of a gun 10 with a bipod support extension system 14 attached to the stock's distal end 16 of the gun 10 using the extension 14 of the illustrated embodiments shown in a contracted or shortened configuration. Any type of gun, firearm or weapon may be used with extension system 14 and the telescopically equipped bolt action rifle of the illustrated embodiment is shown only as an example. Adjustable bipod support 12 is also conventional and any bipod, tripod, monopod or other type of support may be substituted without departing from the spirit and scope of the invention. The depiction of FIG. 1 show extension system 14 as including gun mounting rings 18 coupled to the proximal end portion and a toggle clamp 20 selectively coupled to extension tube 22 forming the distal portion of extension system 14 to which bipod support 12 is coupled. The embodiment of FIGS. 1 and 2 include a single telescopic extension tube 22 and hence a single toggle clamp 20, but the embodiment of FIGS. 3-5 include two telescopic extensions tubes 22 and two corresponding toggle clamps 20 as described in greater detail below. Any number of telescopically nested extension tubes 22 may be employed, but in the illustrated embodiments one or two such tubes 22 accommodate nearly all commonly used rifles.

Figure 2:
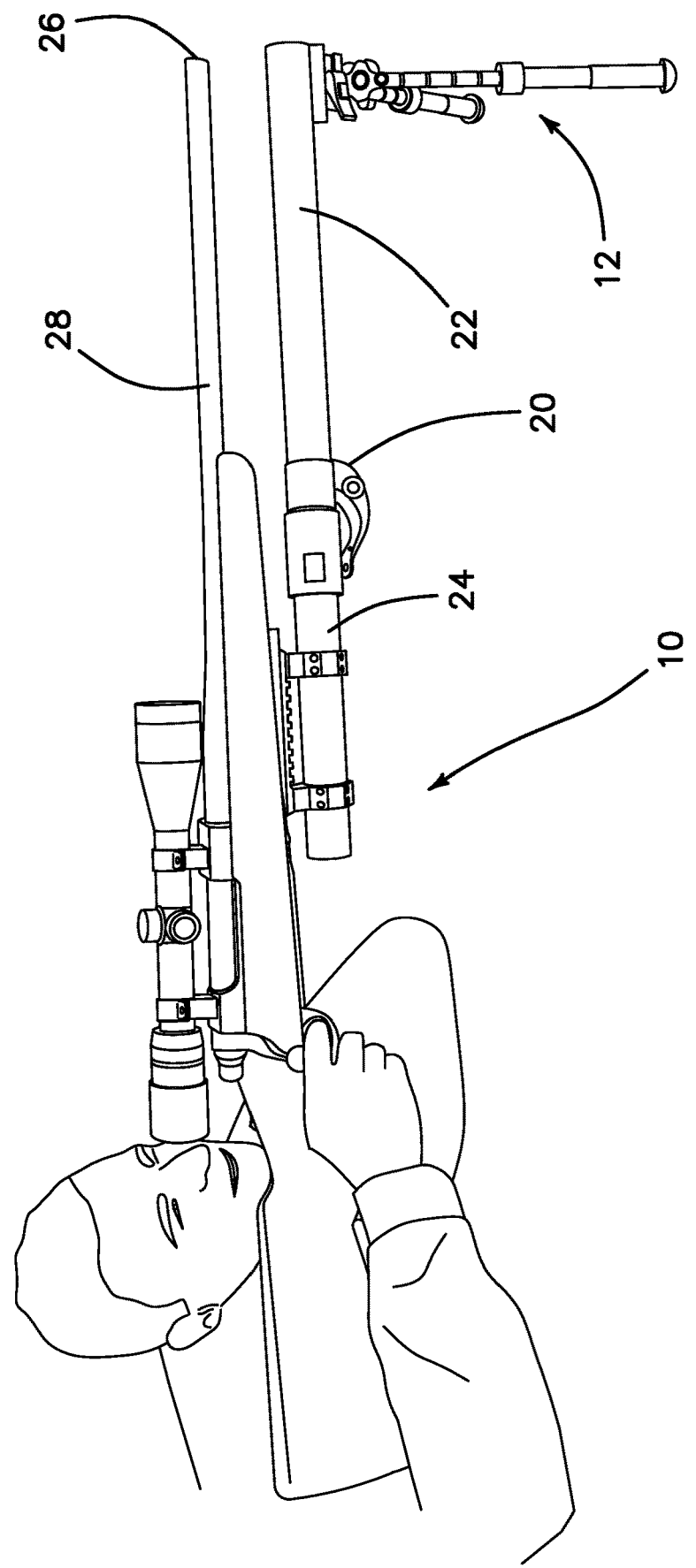
FIG. 2 is a perspective front view of a rifle with a bipod support extension system attached to the stock of the gun using the extension of the illustrated embodiments shown in an extended configuration.
Figure 14:
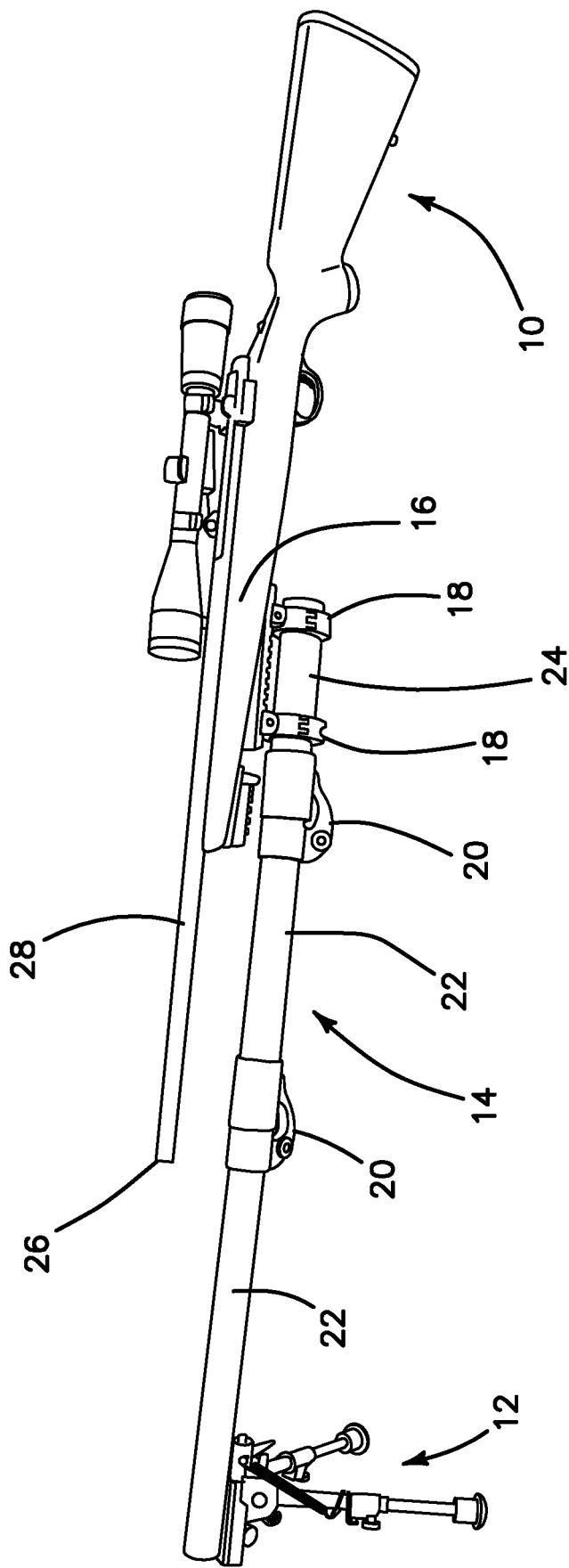
FIG. 14 is a side elevational view of a rifle with the extension system of the illustrated embodiments attached to the stock's distal end shown in an extended configuration placing the bipod support beyond or well in front of the muzzle of the gun.

FIG. 1 shows extension tube 22 fully nested within proximal end portion 24 putting extension system 14 in its contracted configuration and FIG. 2 shows extension tube 22 extended from proximal end portion 24 to put extension system 14 in its extended configuration, where bipod support 12 is aligned or approximately aligned with the muzzle 26 of gun 10. FIG. 14 is a side elevational view of a rifle 10 with a bipod support extension system 14 of the illustrated embodiments attached to the stock's distal end 16 in an extended configuration placing the bipod support 12 beyond or well in front of the muzzle 26 of the gun 10.

It can now be appreciated from FIGS. 1 and 2 that attachment of extension system 14 to the stock's distal end 16 of gun 10 leaves barrel 28 of gun 10 unimpeded by any fitting or connection to extension system 14 and hence bipod support 12. The harmonics of barrel 28 as a projectile is fired, and hence the precision of its trajectory, are thus left free of any added restraints or effects that might be created by result of connection to a bipod support. On the other hand, the effect of biological input and/or unintended movement on the position of muzzle 26 is stabilized and defined by the proximate position of bipod support 12 allowed by extension system 14. The adjustability of extension system 14 thus allows the fitting of system 14 to many different guns 10 having different barrel lengths and physical configurations. Any movement of gun 10 from any biological input and/or un-intended movement during aiming or firing is not mechanically amplified to the relative position of muzzle 26 by a lever arm between the pivot position of bipod support 12 because the distance of lever arm between muzzle 26 and bipod support 12 is set at or close to zero by use of extension system 14 thus statistically reducing the effects of biological input and/or unintended movement during firing.

Figure 3:
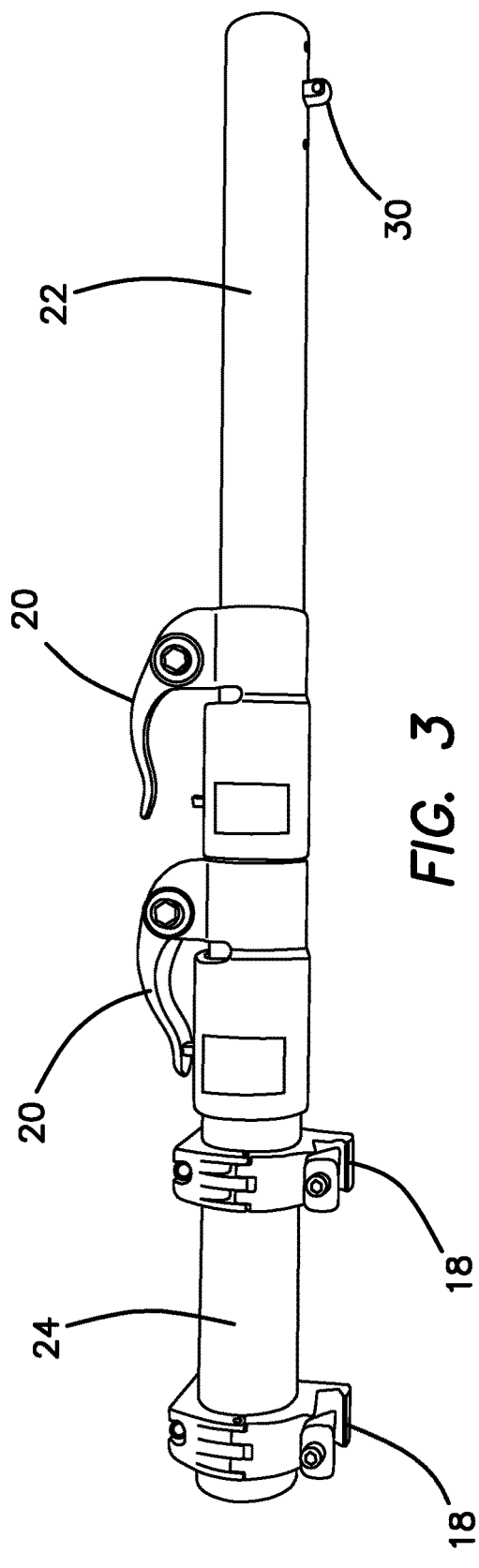
FIG. 3 is a side elevational view of the extension system of the illustrated embodiments shown in a partially contracted configuration in isolation of connection to the bipod support or gun stock.
Figure 4:
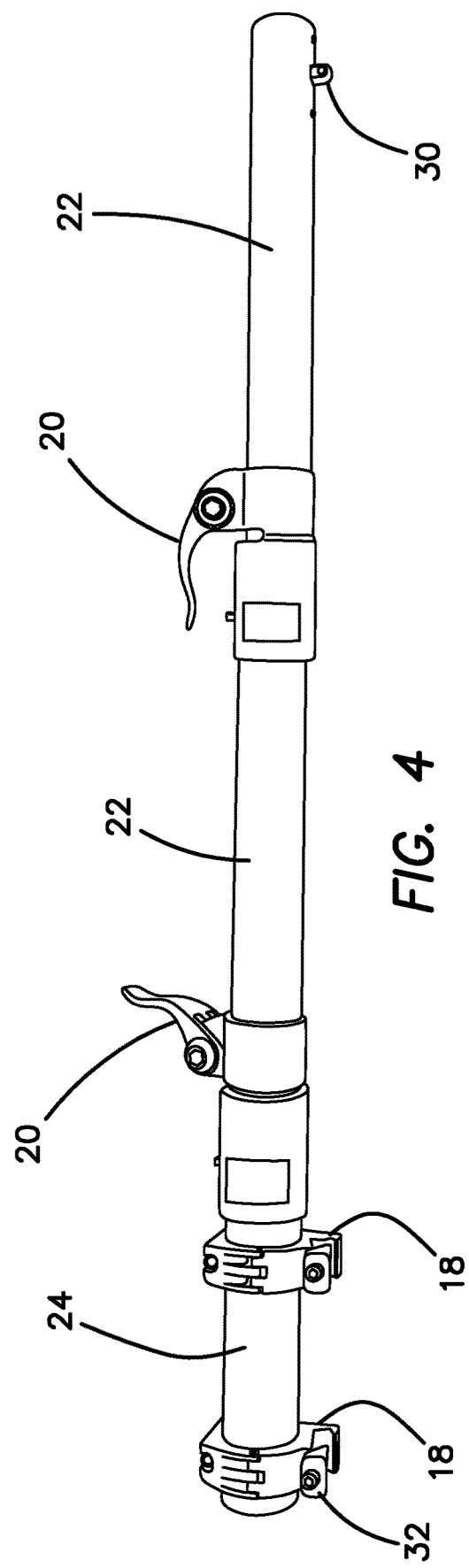
FIG. 4 is a side elevational view of the extension system of the illustrated embodiments shown in the fully-extended configuration in isolation of connection to the bipod support or gun stock.
Figure 5:
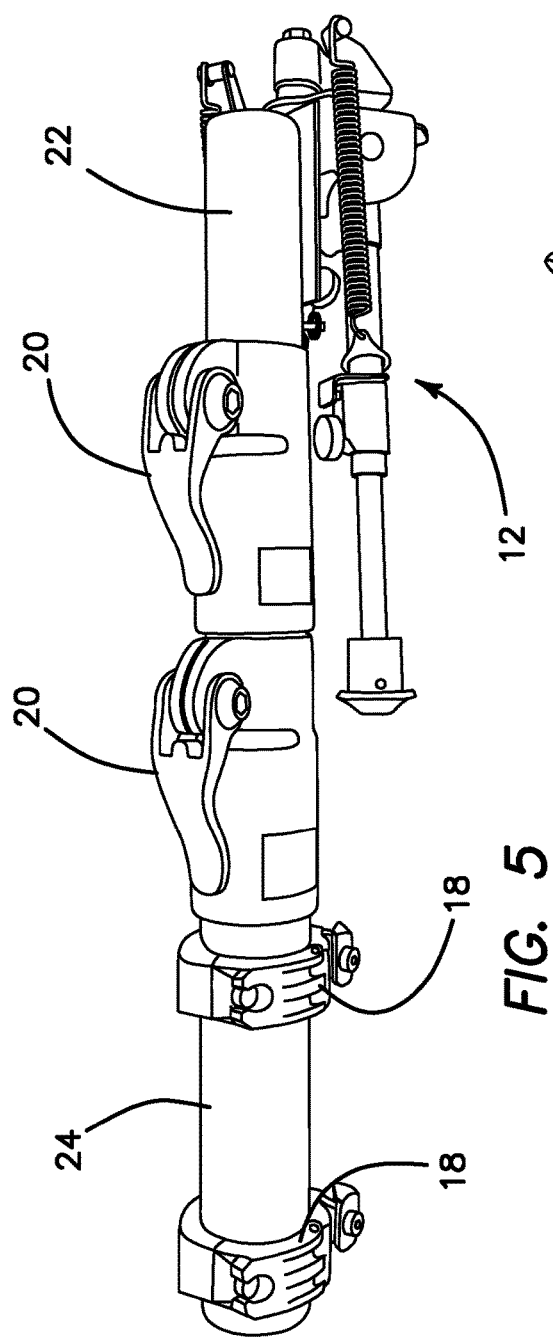
FIG. 5 is a side elevational view of the extension system of the illustrated embodiments shown in the contracted configuration connected to a bipod gun mount in its folded configuration in isolation from the gun.

FIG. 3 is a side elevational view of the extension system 14 of the illustrated embodiments shown in the partially contracted configuration in isolation of connection to the bipod support 12 or gun stock's distal end 16. In the embodiment of FIGS. 3-5 there are two telescopically nested extension tubes 22 nested within each other and within proximal end portion 24, although only one of these tubes 22 is observable in the depiction of FIG. 3. Extension tubes 22 are selectively locked into position using conventional toggle clamps 20. In FIG. 3 one toggle clamp 20 is fixed to end portion 24 and the second toggle clamp 20 is fixed to the distal end of the first extension tube 22. FIG. 4 is a side elevational view of the extension system 14 of the illustrated embodiments shown in the fully-extended configuration in isolation of connection to the bipod support 12 or gun stock 16. FIG. 4 shows the first toggle clamp 20 on the left in the figure unlocked allowing first extension tube 22 on the left to extend from proximal end portion 24. The second toggle clamp 20 on the right in the figure is in the locked position holding the second and distal most extension tube 22 in the right of the figure in position.

FIG. 16 is a side plan view of a second embodiment of the extension system 14 shown in isolation from the gun 10 with a folding forward grip 23 attached to proximal end portion or base tube 24 of extension system 14 by means of a floating ring 21 and with a short distal Picatinny rail 38. The embodiment of FIG. 16 includes a single toggle clamp 20 and extension tube 22.

Figure 22:
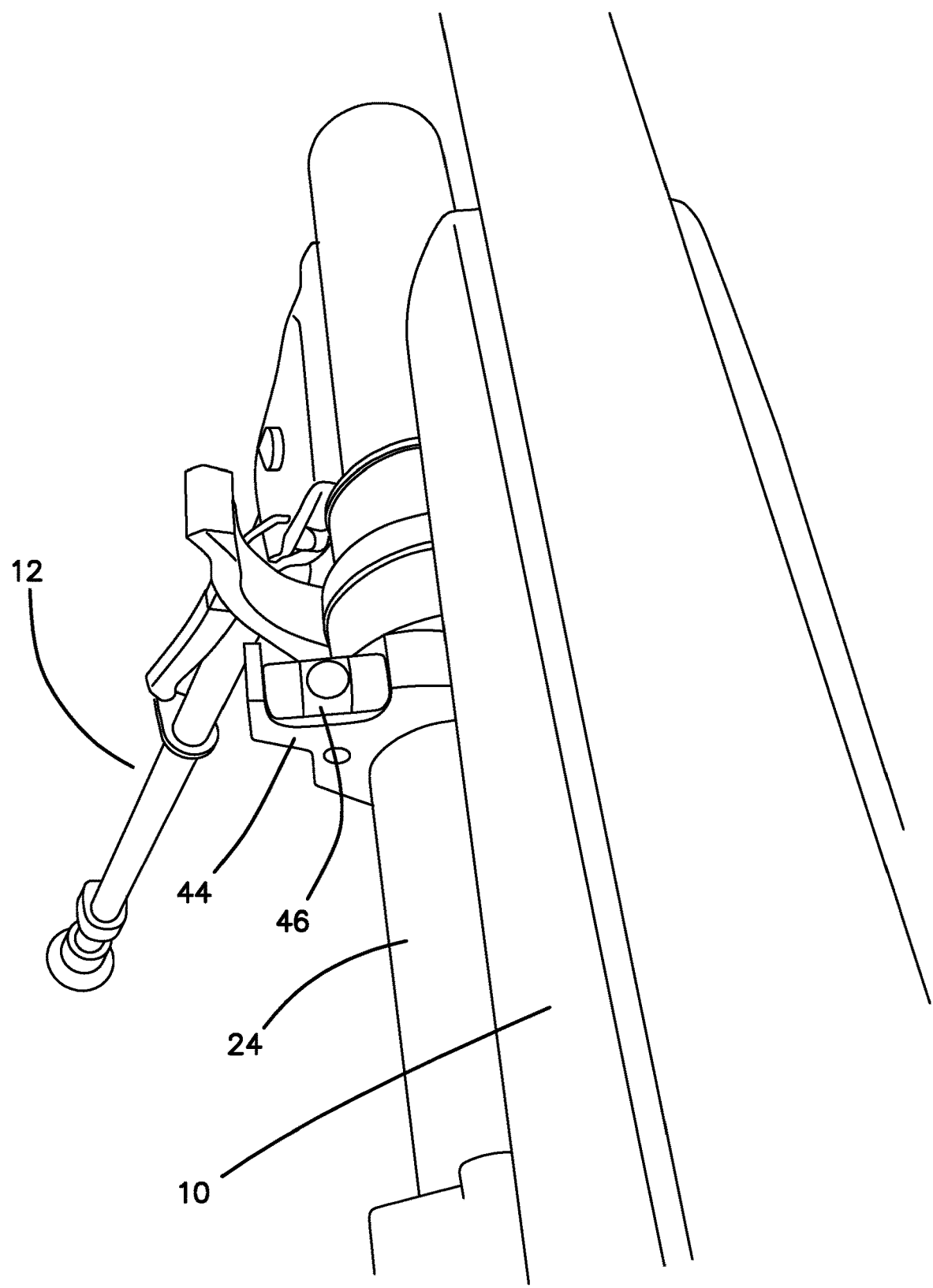
FIG. 22 is a rear perspective view of the bubble level of FIG. 21 shown attached to the extension system when assembled with the gun as would be seen by the shooter when aiming the gun.

A bubble level 44 is also attached to base tube 24 as better illustrated in the side plan view of FIG. 21. Bubble level 44 has a bubble level tube 46 by which the horizontal orientation of extension system 14 and hence gun 10 can be determined as best illustrated in FIG. 22. When locking clamp 20 is in an open position extension tube 22 can rotate 360° to achieve any desired canting correction. Bubble level 44 is employed to level gun 10 at whatever cant bipod 12 or other support might apply to gun 10.

FIG. 17 is a side plan view of an embodiment of FIG. 16 shown in a collapsed configuration and FIG. 18 is a side plan view of an embodiment of FIG. 16 shown in an extended configuration with folding grip 23 extended in an operative position. To adjust the length of extension system 14 locking clamp 20 is pulled into its open configuration. This releases the telescopic feature of extension system 14 and allows the resting point of extension system 14 to be selectively chosen by the user. In the preferred embodiment, the resting point being at, near or in front of the effective muzzle exit of gun 10. Perturbative reorientations or translations of the gun barrel 74 from all possible sources can be characterized as a change in angular orientation of the gun barrel 74. These perturbations can be characterized as a finite distance of movement at the butt or toe of the gun 10 resulting in a change in the angular orientation of the gun 10 during firing, which finite distance will be different for each shooter and gun 10 and even each firing for a given shooter and gun 10. The amount of angular perturbation translated to the gun barrel 74 depends on the geometry defined by the size of the gun 10 from the toe to the pivot or support point of the support or bipod 12. The cone of fire will then depend on the range to the target and the average angular perturbation of the gun barrel 74. It is desirable to have the cone of fire as small as possible. The cone of fire can be changed by changing the pivot point or support point of the gun 10 support relative to the toe of the gun 10 and hence the muzzle 76. It has been discovered that the ratio of two cones of fire with different pivot points for a given perturbation will depend inversely on the ratio of the distances from the toe to the pivot points corresponding to the respective cones of fire and will be independent of the range to the target. For example, doubling the distance from the toe of the gun 10 to the pivot point of the bipod support 12 will halve the cone of fire at the target. The increase of the distance from the toe of the gun 10 to the pivot point of the bipod support 12 is limited as a practical matter by the limitation in the rigidity of materials used, the size of the support accessory which can or is desirable to be carried by a shooter, and the ease of deployment of the bipod support 12.

The locking clamp 20 is returned to the closed and locked position when tube 22 is extended to the desired length. The accurate and precise aiming and firing of a gun is a complex phenomenon dependent on multiple input variables which are not perfectly understood and which continue to be debated among experts. In addition to the known factors of distance to the target and ballistic coefficient of the projectile, the stability of the gun and effective location of the gun muzzle at the moment the projectile exits the muzzle of the barrel affect precision and thus potential accuracy of the gun during each firing process. The angular orientation of the gun relative to gravity, the harmonic reverberations of the barrel caused by firing, the dynamic interaction of the interior ballistics of the barrel in relation to the projectile, the effect of the explosive charge and coupled expansion of gases, the nature of the rifling of the barrel, the nature of the support of the gun, the biological input from the shooter during firing, the engagement of the firing mechanism, sight alignment, sight picture, optics, and other factors may contribute to a determination of an effective muzzle position of the gun during firing. Of all of the previously described factors stability is paramount. An effective way to increase the stability of a gun rested on a bipod or tripod is to alter the geometry of the gun by having its resting point, the bipod or tripod, at or as far in front of the physical muzzle location as it would be practically possible.

FIG. 5 is a side elevational view of the extension system 14 of the illustrated embodiments shown in the contracted configuration connected to a bipod gun mount 12 in its folded configuration in isolation from the gun 10. Bipod support 12 in the illustrated embodiment has spring-loaded adjustable length legs, but any bipod design desired may be employed.

Figure 6:
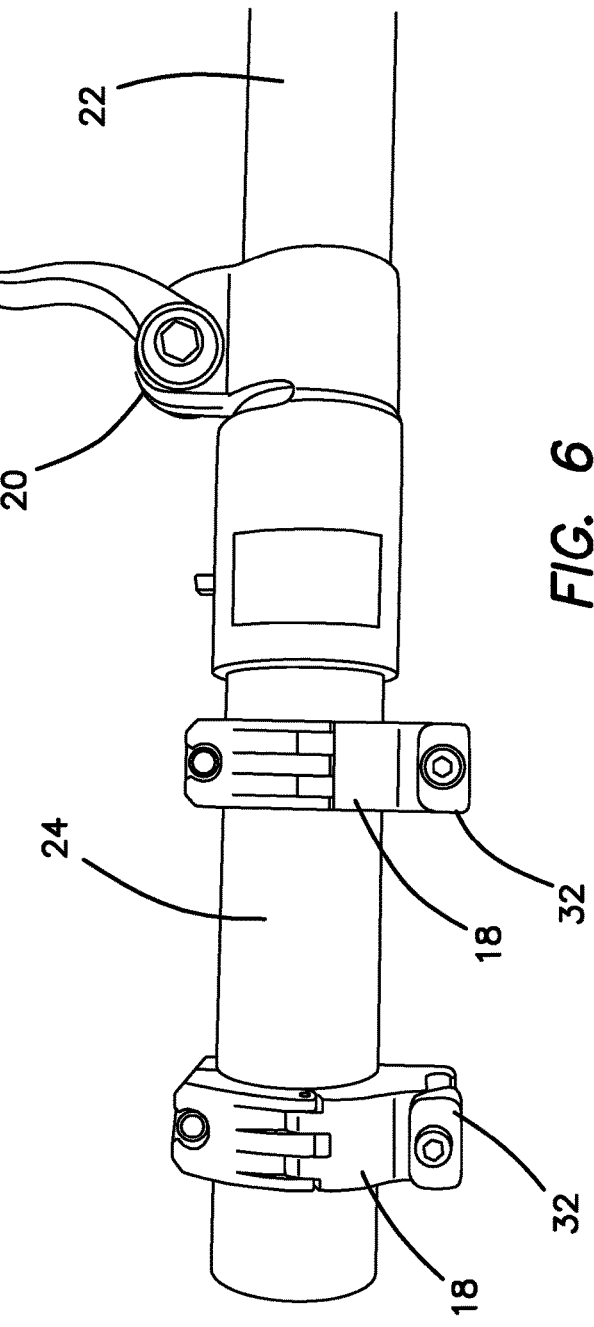
FIG. 6 is a side elevational view of the proximal end portion of the extension system of the illustrated embodiments shown in enlarged view depicting the rear sliding toggle lock and the two mounting rings for attachment to the gun stock.
Figure 7:
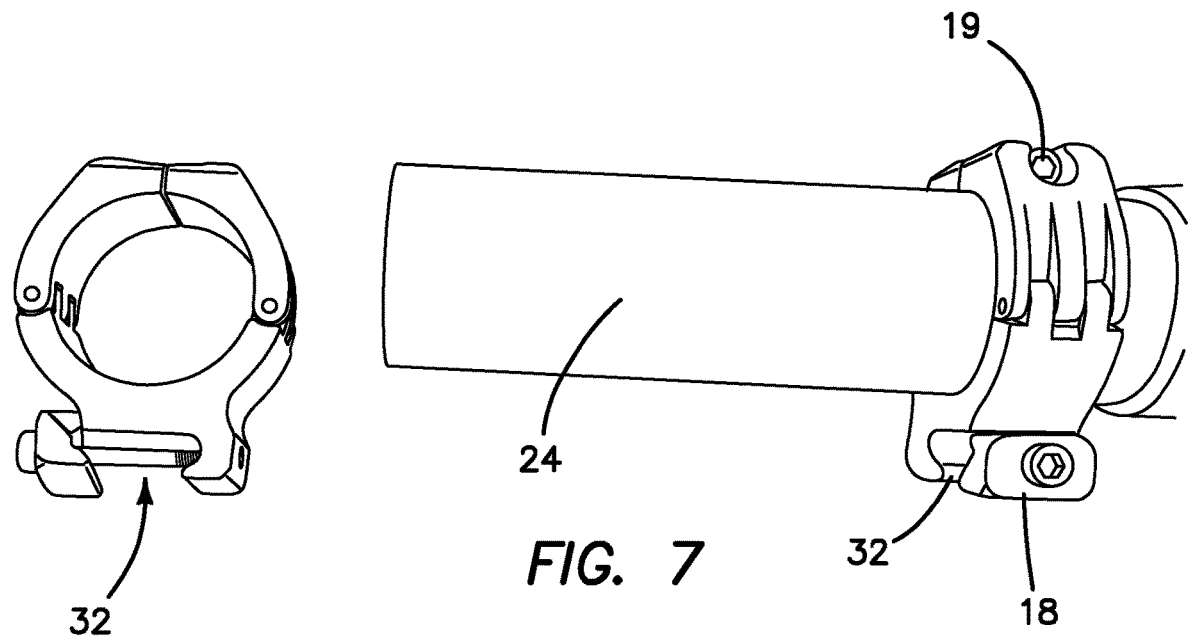
FIG. 7 is a side elevational view of the proximal end portion of the extension system of the illustrated embodiments shown in enlarged view depicting one of the mounting rings detached from the proximal portion of the extension tube and rotated for a better plan view.
Figure 15:
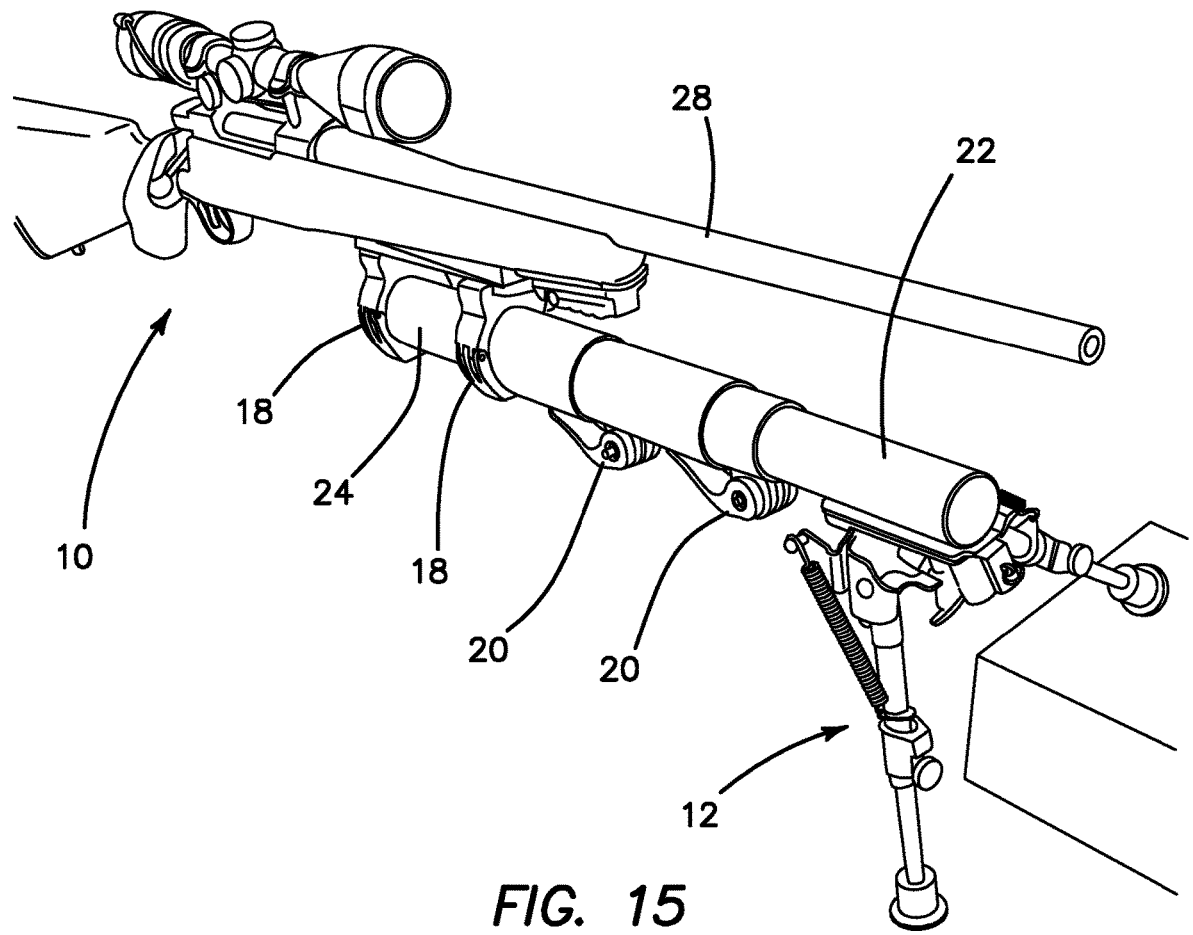
FIG. 15 is a front perspective view of a rifle with the extension system of the illustrated embodiments attached to the stock's distal end shown in a canted configuration where the bipod support rests on an uneven surface.

In the illustrated embodiment end portion 24 and extension tubes 22 are comprised of thick walled carbon fiber tubing, but any strong, rigid material may be equivalently employed. A pair of mounting rings 18 are clamped onto end portion 24 and include a conventional gun fitting 32 best seen in FIG. 7 on their upper portions, such as a Picatinny rail as shown in FIG. 1 attached to the gun stock 16. Locking is accomplished by tightening fitting bolts. FIG. 6 is a side elevational view of the proximal end portion 24 of the extension system 14 of the illustrated embodiments shown in enlarged view depicting the rear sliding toggle clamp 20 and the two mounting rings 18 for attachment to the gun stock. FIG. 7 is a side elevational view of the proximal end portion 24 of the extension system 14 of the illustrated embodiments shown in enlarged view depicting one of the mounting rings 18 detached from the proximal portion 24 and rotated for a better plan view of the conventional gun fitting 32. Note that ring 18 can be positioned on proximal end portion in any desired angular orientation. Its relative angular orientation, once selected, is then fixed by tightening bolt 19 best seen in FIG. 7. Similarly, once an angular orientation is selected, it can be changed by loosening bolts 19 on rings 18, rotating proximal portion 24 within rings 18 and then fixing the new angular orientation by retightening bolts 19. Thus, when gun 10 is canted to the side, when for example, bipod support 12 is placed on a canted surface as shown in FIG. 15 or if the legs of bipod support 12 are unevenly adjusted for any purpose, the canted angular position of gun 10 can be corrected or adjusted. The canting, also known by shooting enthusiasts as "swiveling", is adjusted by rotating the nested tubes 22. This is also much easier to accomplish than loosening and retightening mounting rings 18. Under normal conditions the gun operator will affix and tighten the proximal end portion 24 of the extension system 14 to the stock's distal end 16 with mounting rings 18 only once. Any further desired adjustments, including canting, can be accomplished by simply loosening toggle clamps 20, making the adjustments by rotating extension tubes 22 with respect to each other and retightening clamps 20. This is possible because the nested tubes 22, besides extending and collapsing, also rotate in either direction relative to one another by any degree from 0 to 360° or more. This allows for "extreme canting".

Figure 8:
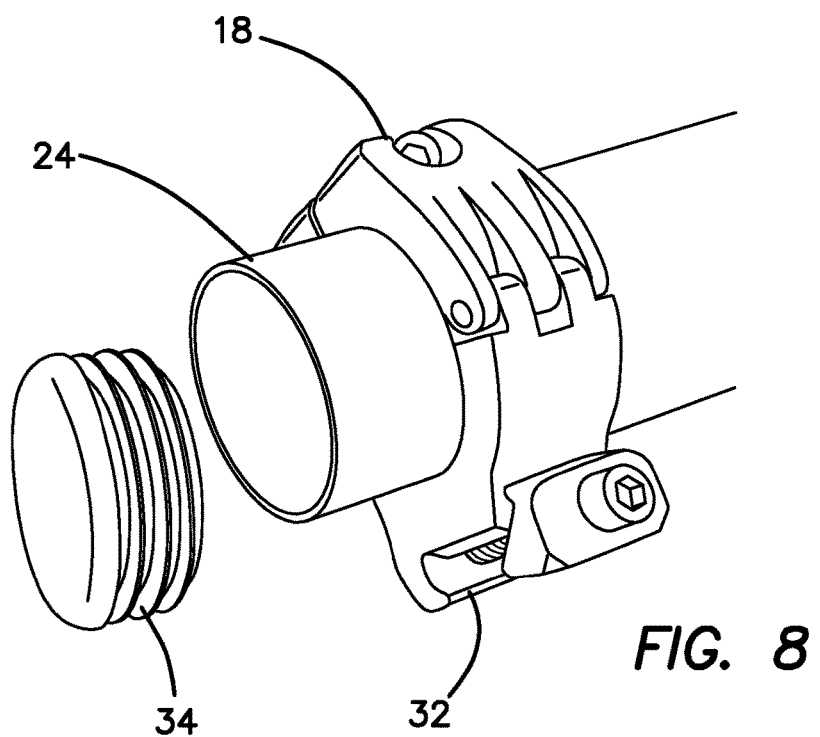
FIG. 8 is an end perspective view of the proximal end portion of the extension system of the illustrated embodiments shown in enlarged view depicting an end plug for closing the proximal end portion.

FIG. 8 is an end perspective view of the proximal end portion 24 of the extension system 14 of the illustrated embodiments shown in enlarged view depicting an end plug 34 for closing the proximal end portion 24. End plug 34 is compression fit into the proximal end of end portion 24, but threaded, glued or pinned plugs could also be utilized.

Figure 9:
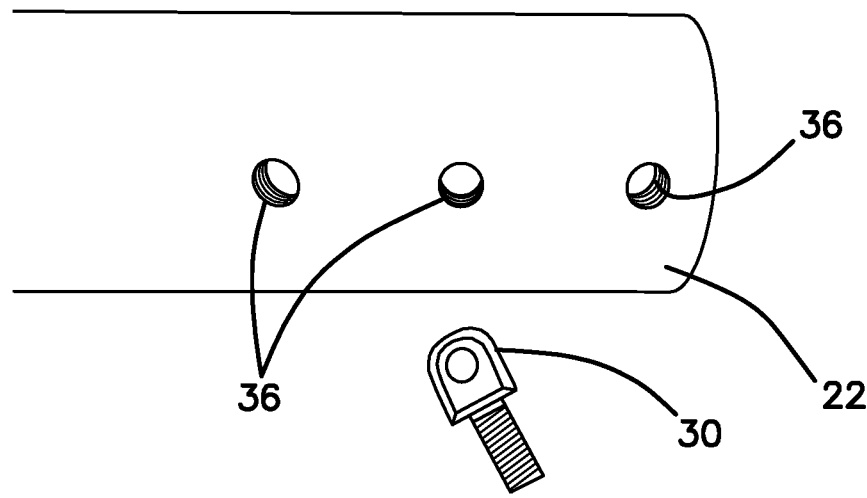
FIG. 9 is a bottom elevational view of the distal end portion of the extension system of the illustrated embodiments shown in enlarged view depicting the threaded mounting holes and a sling swivel stud mounting screw shown as detached by which the "sling swivel stud" type of bipod supports, such as the widely recognized Harris style of bipods, will be coupled to the extension system.
Figure 11:
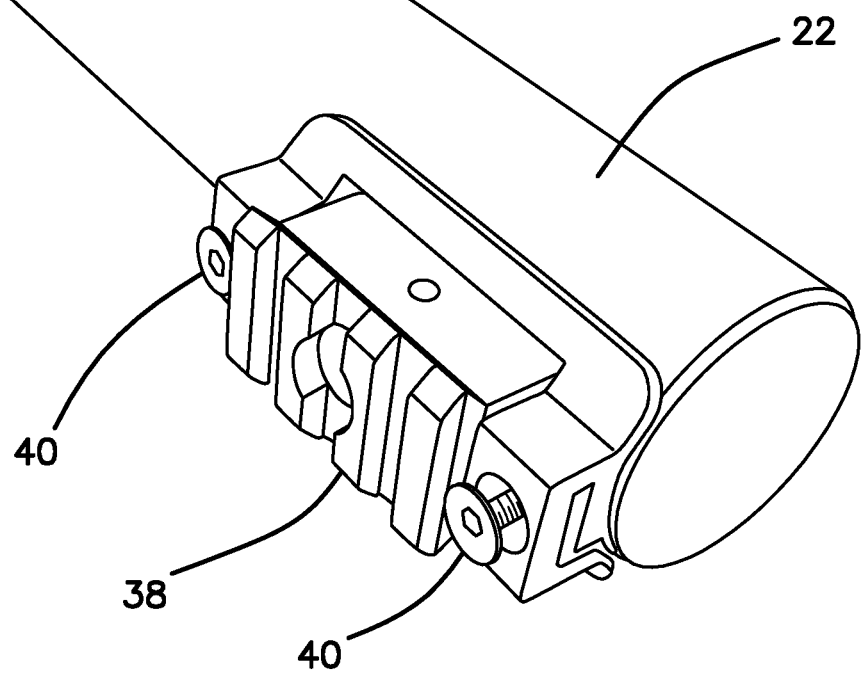
FIG. 11 is a partial bottom elevational view of the distal end portion of the extension system of the illustrated embodiments shown in enlarged view depicting the installed bipod supporting block. In this case the sling swivel stud screw was removed and a Picatinny rail was instead mounted to the embodiment to allow for the attachment to a Picatinny-styled bipod or tripod or the attachment of accessories of the same styled attachment system.
Figure 13:
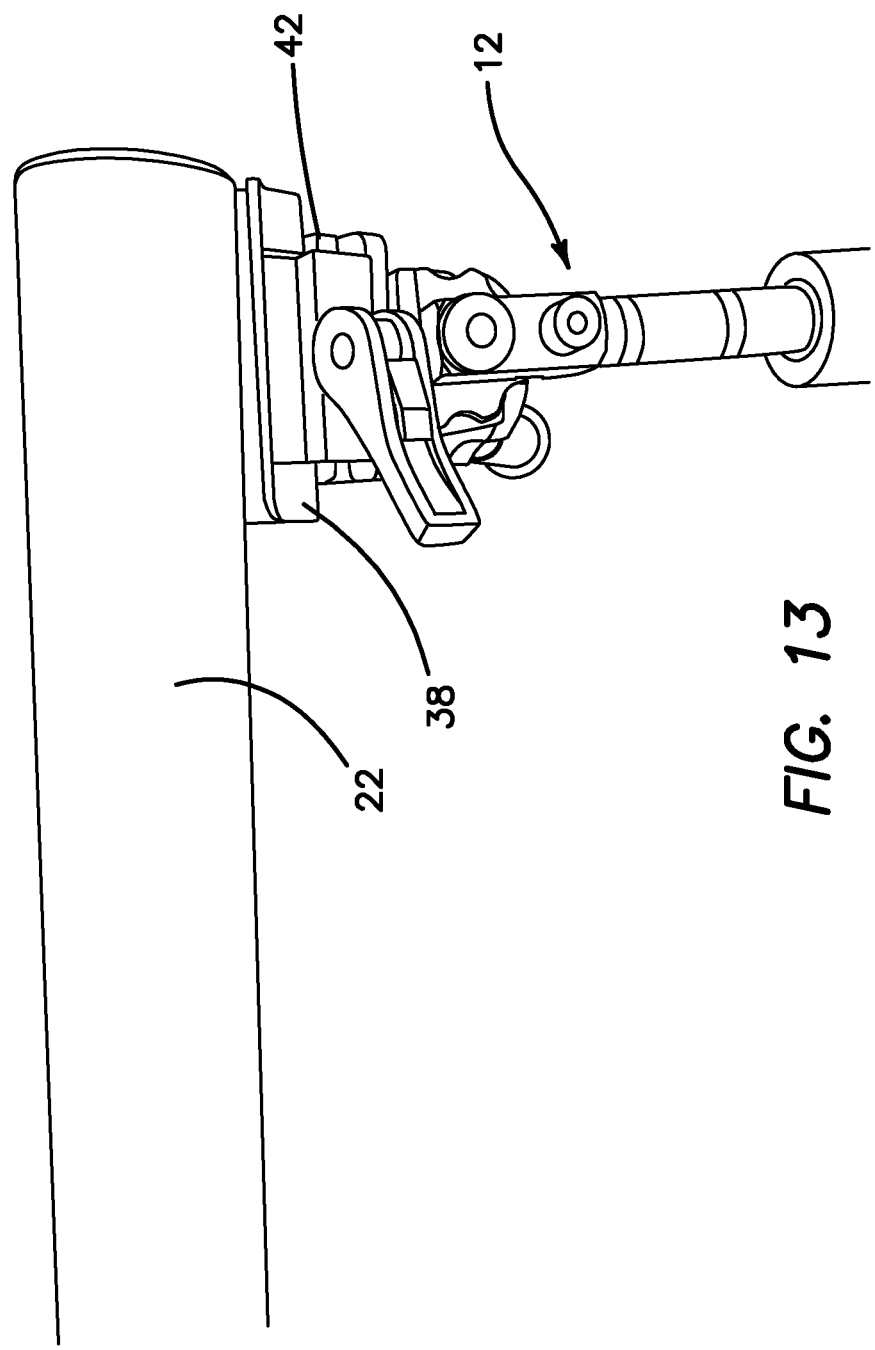
FIG. 13 is a side elevational view of the distal end portion of the extension system of the illustrated embodiments shown in enlarged view depicting the installed bipod support.

FIG. 9 is a bottom elevational view of the distal end of extension tube 22 of the extension system 14 of the illustrated embodiments shown in enlarged view depicting the threaded mounting holes 36 and mounting screw 30 shown as detached by which different versions of the bipod support 12 will be coupled to the extension system 14. FIG. 10 is a partial bottom elevational view of the distal end of extension tube 22 of the extension system 14 of the illustrated embodiments shown in enlarged view depicting the installed sling swivel stud mounting screw 30. A more modern alternative mounting method to the sling swivel stud mounting screw 30 is the Picatinny rail attachment system 38 shown as detached in perspective view. Sling swivel stud mounting screw 30 is selectively installed in anyone of the threaded holes 36 in extension tube 22 and a sling swivel stud mounting type of bipod can be attached to it, as shown in FIG. 5. Alternatively, the sling swivel stud mounting screw 30 can be removed to allow for the attachment of a Picatinny rail 38 to which a Picatinny rail type of bipod, or most any Picatinny rail type accessory could attach, as shown in FIG. 13. Picatinny rail attachment system 38 attaches to tube 22 by two through bolts 40 threaded into the end holes 36 as best depicted in FIG. 11. FIG. 11 is a partial bottom elevational view of the distal end of tube 22 of the extension system 14 of the illustrated embodiments shown in enlarged view depicting the installed Picatinny rail attachment system 38. In another embodiment Picatinny rail 38 and sling swivel stud mounting screw 30 are both included, each one on an opposing side of the distal end of extension tube 22.

FIG. 12 is a partial bottom elevational view of the distal end portion of the extension system 14 with Picatinny rail 38 of the illustrated embodiments shown in enlarged view depicting the Picatinny rail attachment system 38 with the mating mounting fixture 42 of the bipod support 12 shown as detached. FIG. 13 is a side elevational view of the distal end portion of the extension system 14 of the illustrated embodiments shown in enlarged view depicting the installed bipod support 12 coupled to Picatinny rail attachment system 38.

Figure 25:
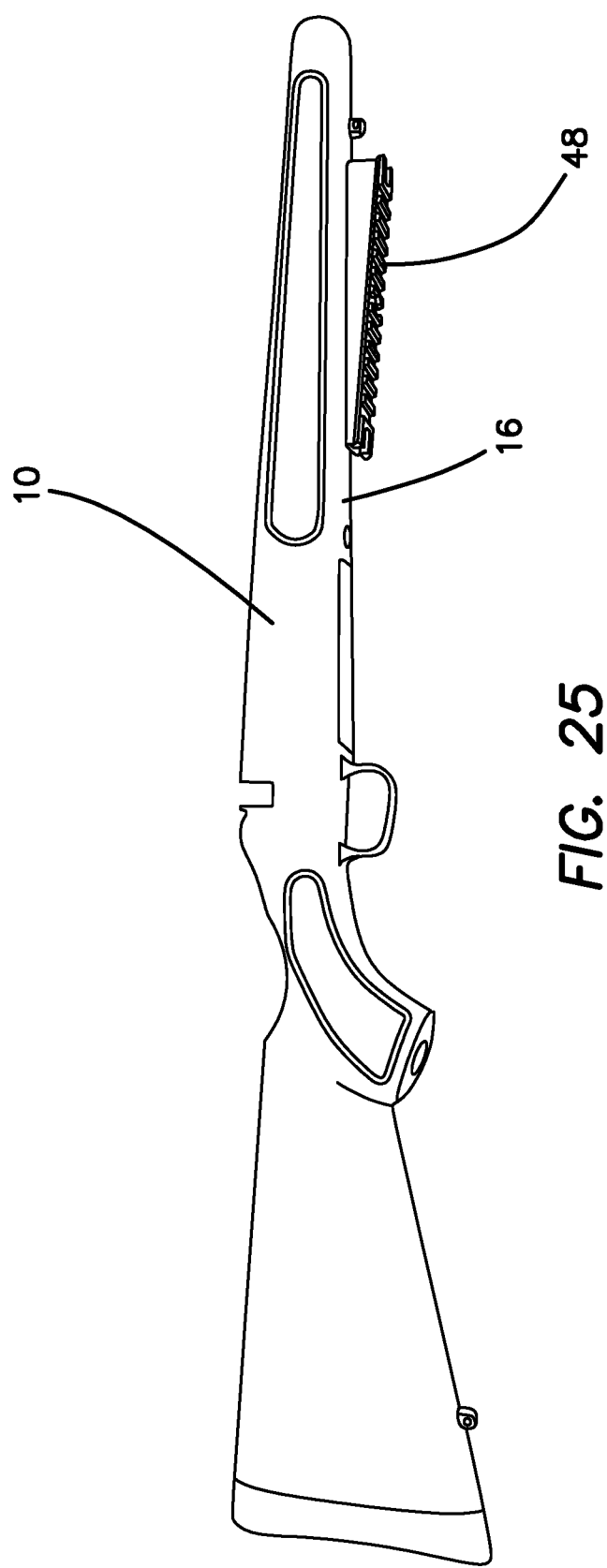
FIG. 25 is a side plan elevational view of the tilted Picatinny rail attached to the stock of a gun.
Figure 26:
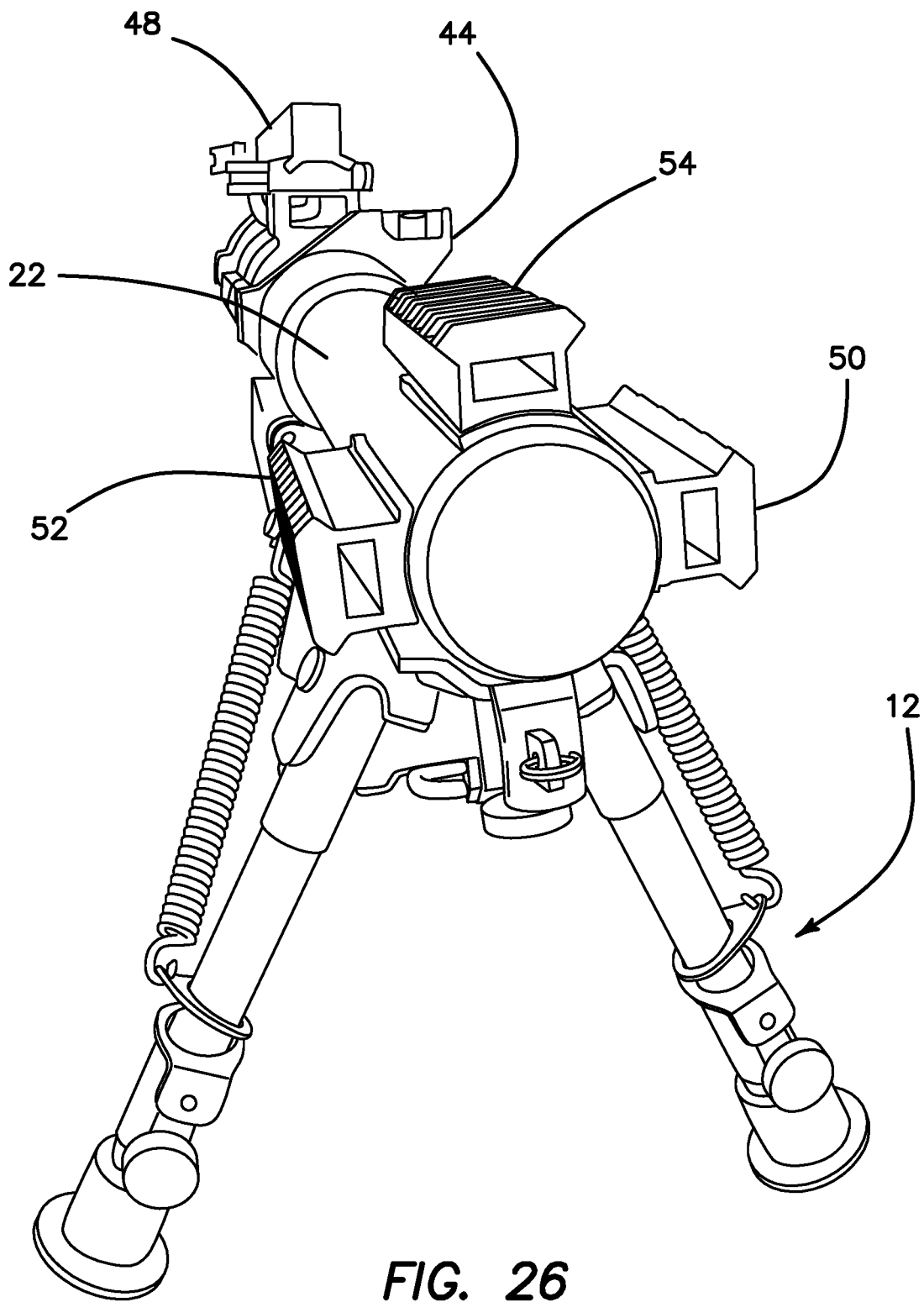
FIG. 26 is an end perspective view of the extension system shown in isolation of the gun in which the distal end of the extension system is provided with a bipod support and three orthogonally positioned Picatinny rails for connection with other accessories.

FIG. 19 is a side plan view of the embodiment of FIG. 16 in exploded view being attached or mounted to a gun 10 using a tilted Picatinny rail 48 and a bipod 12. FIG. 20a is a perspective view of the quick detach mounting ring 18 in an unlocked configuration where toggle lever 19 is rotated to an open configuration releasing mounting ring 18 from tilted Picatinny rail 48. FIG. 20b is a perspective view of the quick detach mounting ring 18 in a locked configuration where toggle lever 19 is rotated to a closed configuration locking mounting ring 18 to tilted Picatinny rail 48. The attachment of Picatinny rail 48 to the gun stock 16 is better illustrated in the side plan elevational view of FIG. 25.

Figure 23:
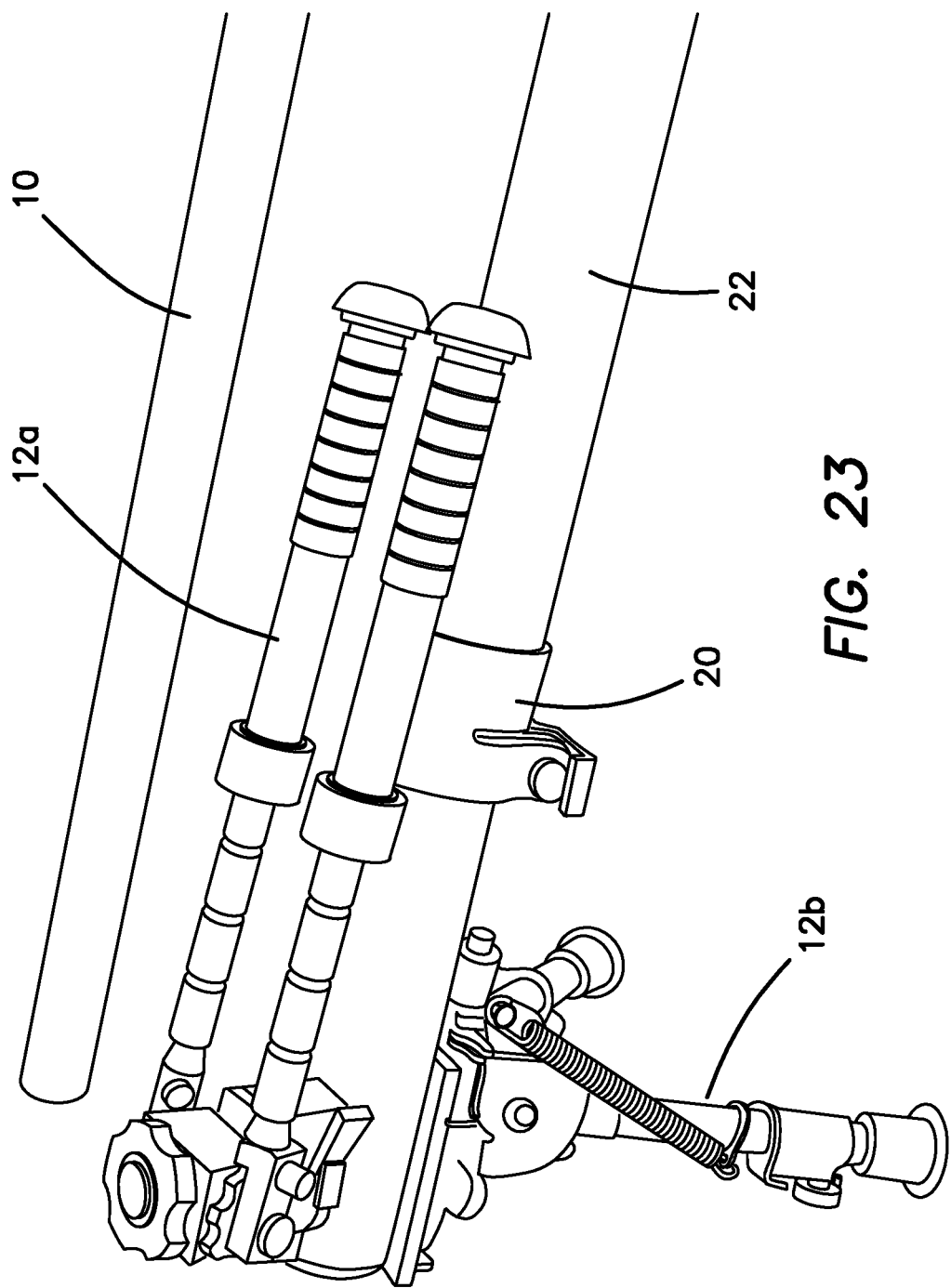
FIG. 23 is perspective view of an embodiment of the extension system where two differently sized bipods are attached to the distal end of the extension system with the upper bipod in a folded or collapsed configuration and the lower bipod extended.
Figure 24:
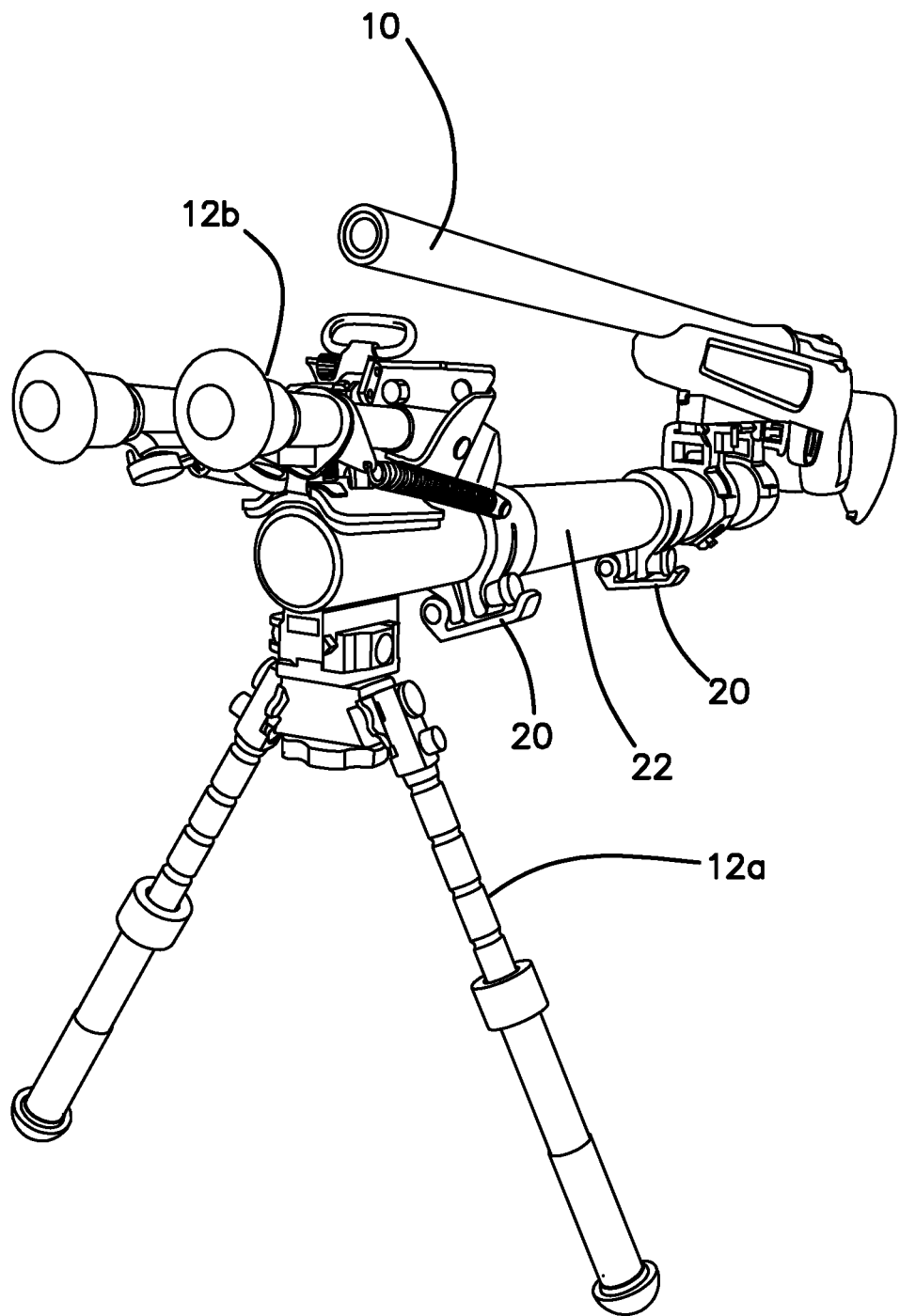
FIG. 24 is perspective view of the embodiment of FIG. 23 with the two bipods rotated by rotation of the distal end of the extension system to reverse the positions of the bipods, the upper bipod of FIG. 23 now shown as lowermost and extended and the lower bipod of FIG. 23 now shown as uppermost and folded into a collapsed configuration.

FIGS. 23 and 24 illustrate another embodiment where two bipods 12a and 12b are fixed to the distal end of extension system 14. FIG. 23 is a perspective view of an embodiment of the extension system 14 where two differently sized bipods 12a and 12b are attached to the distal end of the extension system 14 with the upper bipod 12a in a folded or collapsed configuration and the lower bipod 12b extended. FIG. 24 is a perspective view of the embodiment of FIG. 23 with the two bipods 12a and 12b rotated by a 180° rotation of the distal end of the extension system 14 to reverse the positions of the bipods 12a and 12b, the upper bipod 12a of FIG. 23 now shown as lowermost and extended and the lower bipod 12b of FIG. 23 now shown as uppermost and folded into a collapsed configuration.

Figure 27:
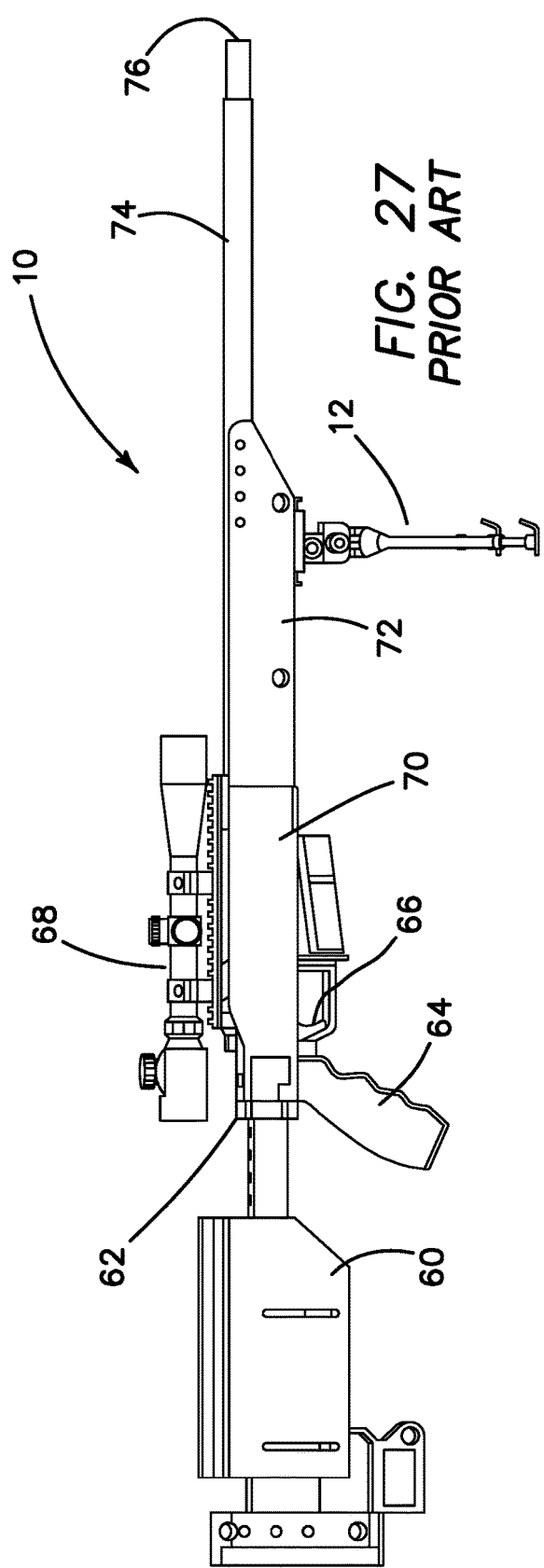
FIG. 27 is a side elevational view of a prior art gun with a bipod support.
Figure 28:
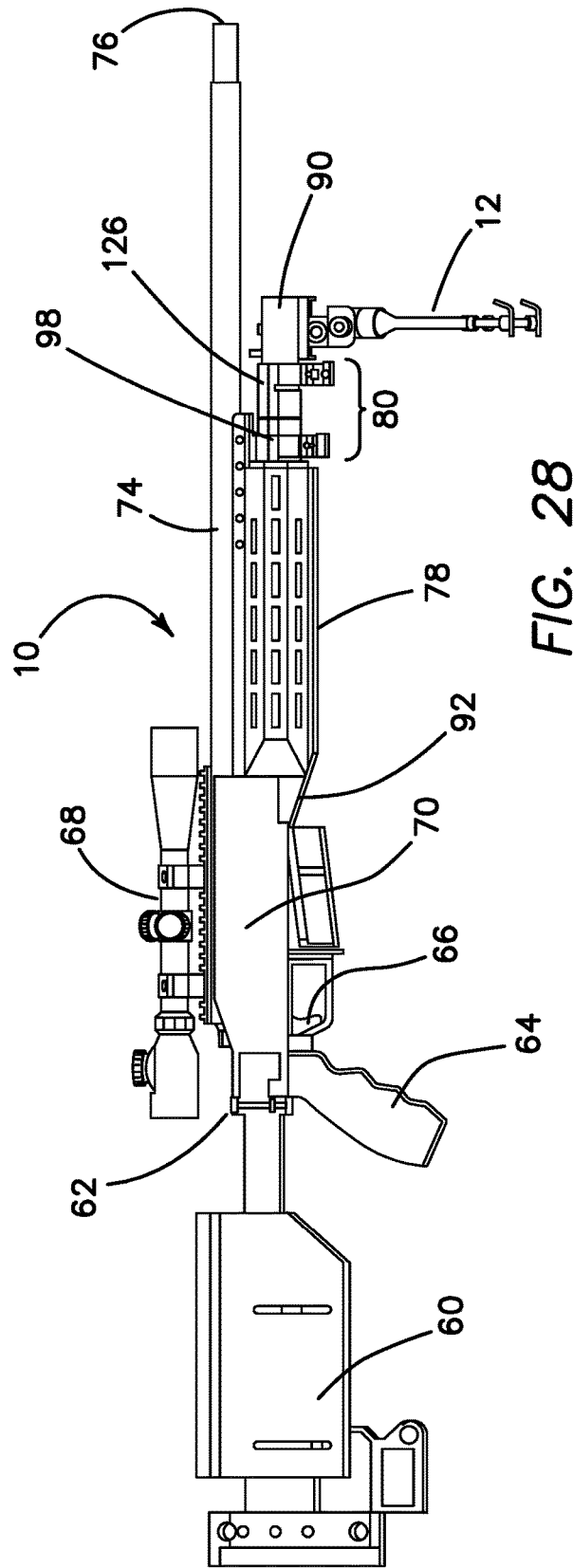
FIG. 28 is a side elevational view of the gun of FIG. 27 modified according to the illustrated embodiments of the invention with a fore-end in which a closed, or in collapsed state, telescopic bipod extension is included for a bipod support.

FIG. 27 is a side elevational view of a prior art gun 10 with a bipod support 12, which gun 10 differs configuration from that shown in FIG. 1. Gun 10 includes a plurality of conventional components, including a folding buttstock 60 pivoted on pin 62 with a pistol grip 64, trigger mechanism 66, telescopic sight 68, receiver 70, fore-end 72 and a barrel 74 with a muzzle 76. FIG. 28 is a side elevational view of the gun 10 of FIG. 27 modified according to the illustrated embodiments of the invention with a fore-end 78 in which a telescopic bipod extension 80 is included for a bipod support 12 replacing fore-end 72 of gun 10 of FIG. 27. In FIG. 28 extension 80 is fully retracted into fore-end 78 and bipod support 12 is behind muzzle 76 of gun 10. FIG. 29 is a side elevational view of the gun 10 of FIG. 28 in which the telescopic bipod extension 80 has been partially deployed from the fore-end 78 of the gun 10 to place the bipod support 12 at or near the muzzle 76 of the gun 10 in accordance with the teachings of the invention above. It is to be understood that bipod support is ideally attached at a position which minimizes the movement of muzzle 76 due to any unintended movement of gun 10 or barrel 74 from any cause. Thus, it is possible that the effective position of muzzle 76 from the viewpoint of minimization of movement may not be at the anticipated physical location of muzzle 76, the exit orifice of gun 10, but may be at a slightly different longitudinal position according to the effect of a projectile fired through barrel 74. This in turn could depend very subtly on the rifling in barrel 74 and the nature of the projectile. In any case, FIG. 29 illustrated the ability to fine tune the position of bipod support 12 relative to muzzle 76 to obtain minimization of effect of unintended movement. Furthermore, FIG. 29 illustrates how the embodiment of this Figure is able to position bipod support 12 laterally physically closer to muzzle 76 than in the embodiment of FIG. 2 where the bipod extension 14 is mounted exterior to stock 16 of gun 10.

FIG. 30 is a side elevational view of the gun 10 of FIG. 28 in which the telescopic bipod extension 80 has been deployed from the fore-end 78 of the gun 10 to place the bipod support 12 in front of the muzzle 76 of the gun 10.

Figure 31:
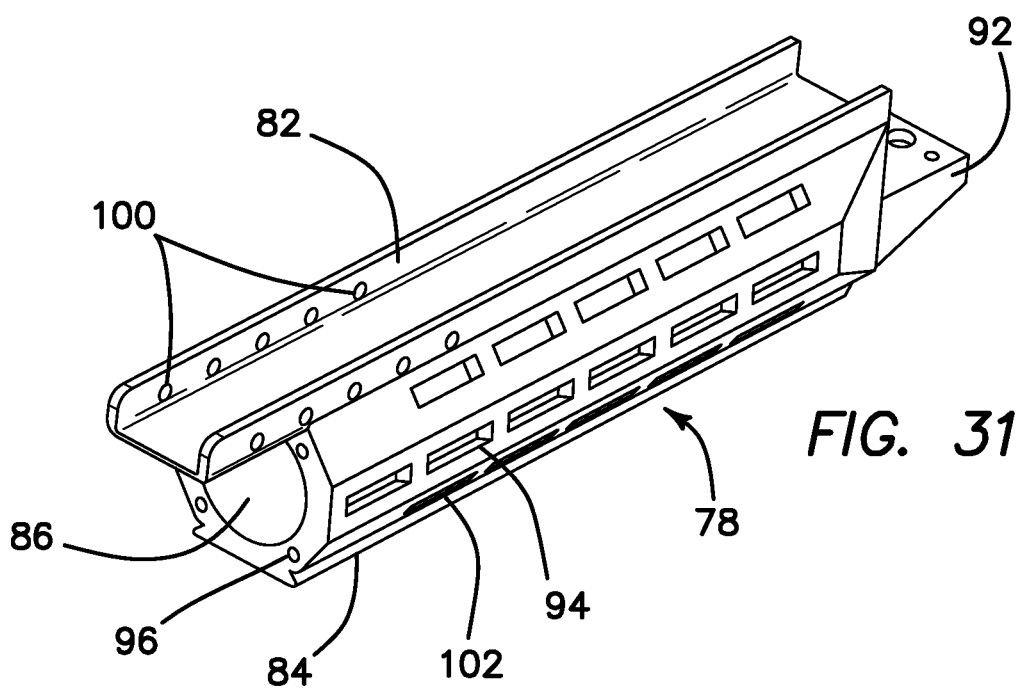
FIG. 31 is an isometric view of the fore-end of the gun used in FIGS. 27-29 according to one embodiment of the invention.

The details of fore-end 78 and extension 80 can be understood and appreciated by turning now to FIGS. 30-40. FIG. 31 is an isometric view of the fore-end 78 of the gun 10 as seen in FIGS. 27-29 according to one embodiment of the invention. As shown in FIG. 31 fore-end 78 includes an integral bracket portion 82 in the form of a prismatic U-shaped channel and a lower octagonal body 84 having a cylindrical interior cavity 86 defined therein for receiving a first extension tube 88 as shown best in FIG. 30. Tube 88 freely slip fits or slides within cavity 86 of fore-end 78. The opposing end of body 84 integrally extends into a bracket 92, shown in cross sectional view in FIG. 34, which is bolted or screwed into receiver 70 as best seen in FIG. 30. Body 84 is provided with a plurality of cavities 94 on or in its exposed exterior surfaces to form a modular lock (M-LOK) firearm rail interface system developed by Magpul Industries for direct accessory attachment onto the "negative space" (hollow slot) mounting points. It is to be understood that the exterior surfaces of fore-end 78 could also be modified to provide mounting surfaces using other types of mounting systems, such as KeyMod system or Picatinny rail systems. It can be appreciated by studying FIG. 31 that portion 82 surrounds, but does not support, touch nor is it connected to barrel 74. Barrel 74 is left free floating in integral bracket portion 82 so that harmonic or vibrational reverberations of barrel 74 during firing is unaffected by integral bracket portion 82.

Figure 35:
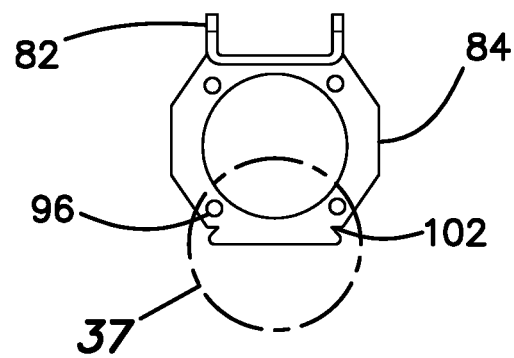
FIG. 35 is an end plan view of the fore-end of FIG. 31.
Figure 32:
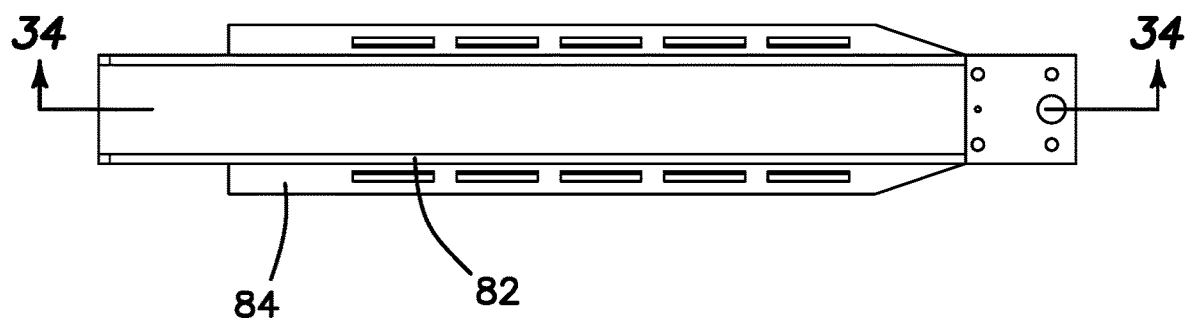
FIG. 32 is top plan view of the fore-end of FIG. 31.
Figure 33:
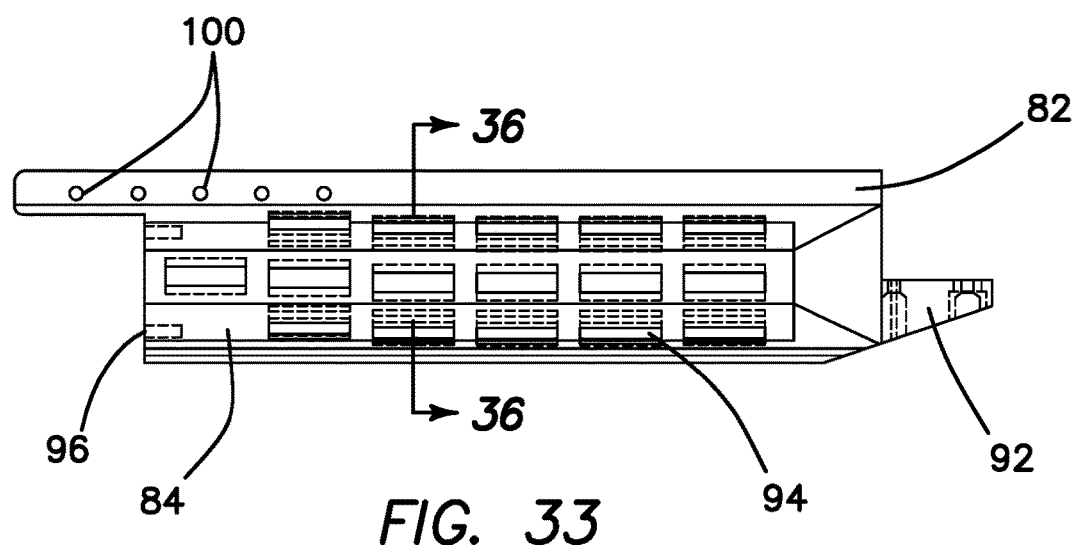
FIG. 33 is a side plan view of the fore-end of FIG. 31.
Figure 34:
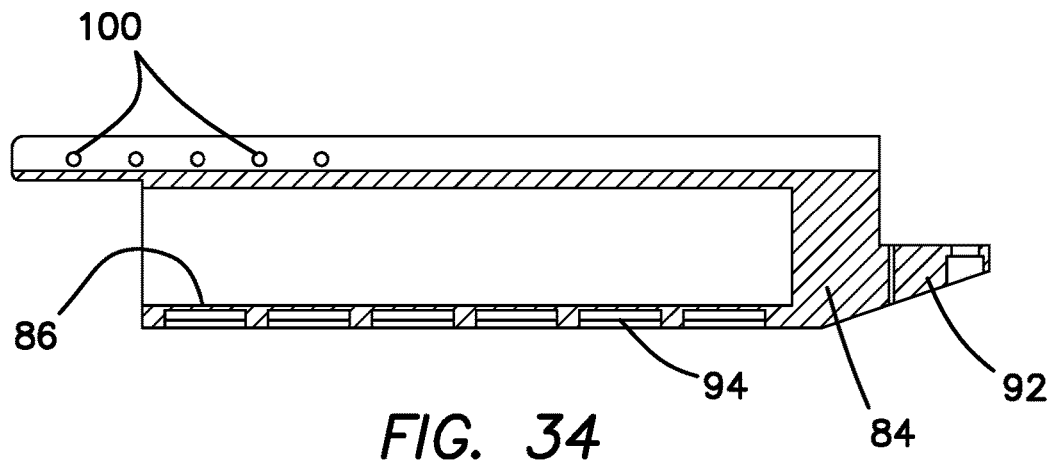
FIG. 34 is a longitudinal cross sectional view of the fore-end of FIG. 31 as seen through sections lines 34-34 of FIG. 32.
Figure 39:
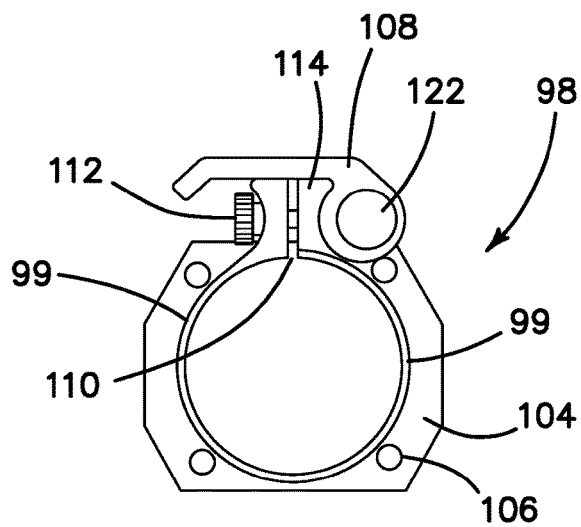
FIG. 39 is an end plan view of the clamp of FIG. 38.

FIG. 32 is a top plan view of the fore-end 78 of FIG. 31 and clearly shows the extension of integral channel 82 beyond body 84. This extension of integral channel 82 and the adjacent portion of it are provided with a plurality of through-holes 100, which provided additional means for mounting accessories adjacent to barrel 74, such as, but not limited to, clip-on night vision equipment (not shown). These mounting holes 100 are best seen in FIG. 33 which is a side plan view of the fore-end 78 of FIG. 31. FIG. 34 is a longitudinal cross sectional view of the fore-end 78 of FIG. 31 as seen through sections lines 34-34 of FIG. 32 and clearly shows the definition of cylindrical cavity 86 in body 84 for receiving first extension tube 88. The end of body 84 is shown in FIG. 31 as being provided with four threaded bores 96 for mounting a body clamp 98 as best shown in FIG. 39. FIG. 35 is an end plan view of the fore-end 78 of FIG. 31 clearly showing the mounting holes 96 for clamp 98.

Figure 36:
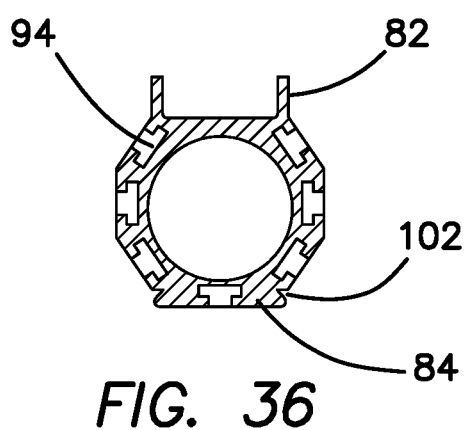
FIG. 36 is a perpendicular cross sectional view of the fore-end of FIG. 31 as seen through sections lines 36-36 of FIG. 33.
Figure 37:
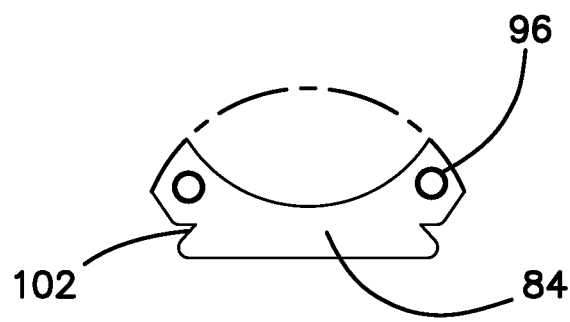
FIG. 37 is a perpendicular cross sectional partial view in enlarged scale of the portion of fore-end of FIG. 31 as seen in inset circle 37 of FIG. 35.

FIG. 36 is a perpendicular cross sectional view of the fore-end 78 of FIG. 31 as seen through sections lines 36-36 of FIG. 33 and provides the best depiction of M-LOK cavities 94 defined in body 84. FIG. 37 is a perpendicular cross sectional partial view in enlarged scale of the portion of fore-end 78 of FIG. 31 as seen in inset circle 37 of FIG. 35 and provides clearer detail on the lower mounting holes 96 and a lower dovetailed prismatic mounting rail 102 on the lowermost surface of body 84, with said dove tail conforming to the Really Right Stuff ("RRS") Dovetail standard developed by Really Right Stuff, LLC of Lehi, Utah.

Figure 38:
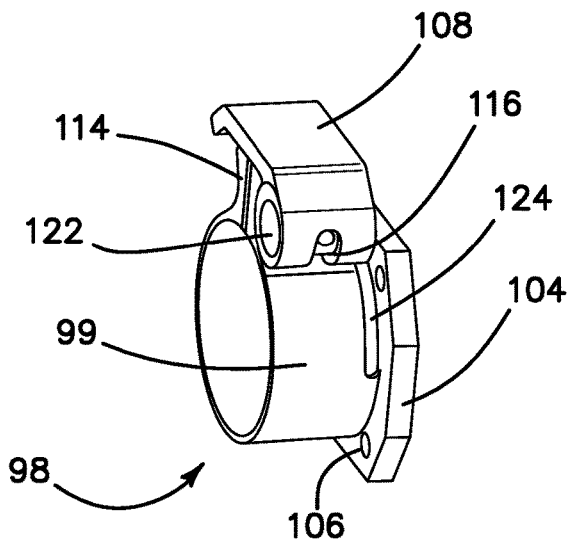
FIG. 38 is an isometric view of a clamp that mounts to the fore-end of FIG. 31 for locking the first extension tube therein.
Figure 40:
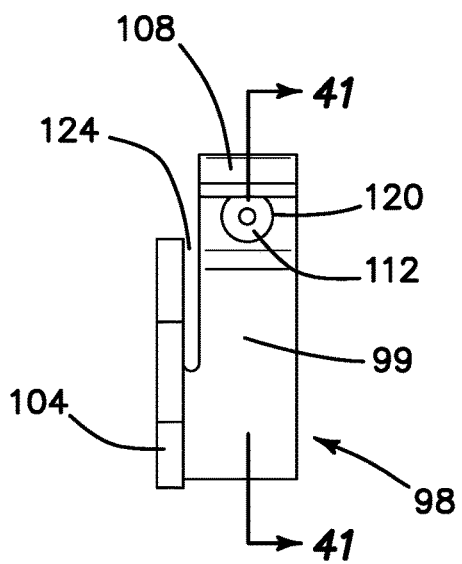
FIG. 40 is a side plan view of the clamp of FIG. 38.
Figure 41:
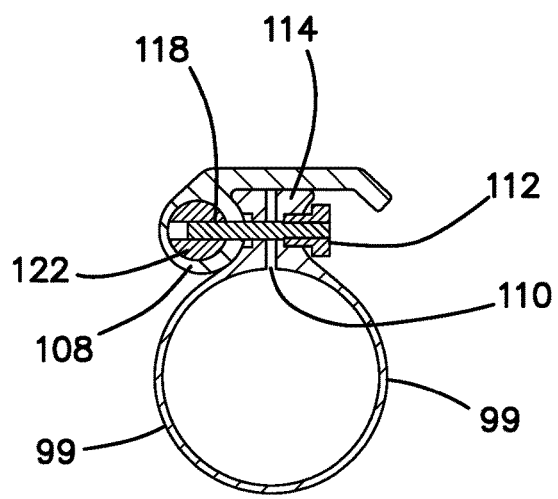
FIG. 41 is a perpendicular cross sectional view of the clamp of FIG. 38 as seen through section lines 41-41 of FIG. 40.

FIG. 38 is an isometric view of a clamp 98 that mounts to the fore-end 78 of FIG. 31 for selectively locking the first extension tube 88 therein. FIG. 39 is an end plan view of the clamp 98 of FIG. 38. FIG. 40 is a side plan view of the clamp 98 of FIG. 38. FIG. 41 is a perpendicular cross sectional view of the clamp 98 of FIG. 38 as seen through section lines 41-41 of FIG. 40. Clamp 98 includes an integral base 104 into which four boreholes 106 have been defined aligned with threaded holes 96 in fore-end 78 and through which clamp 98 is screwed or bolted to fore-end 78. The top of clamp 98 is provided with an eccentric toggle lever 108, which is used to tighten clamp 78 around first extension tube 88 by rotating lever 108 into the position seen in FIGS. 37-40 when tube 88 is inserted through clamp 98. The body of clamp 98 is comprised of two resilient circular opposing sides 99 separated by a gap 110 best seen in FIGS. 38 and 40. An adjustment bolt 112 is disposed through two opposing through holes in the top extended end 114 of clamp 98, through a slot 116 defined in the eccentric lobe 116 of lever 108 as shown in FIG. 38. The threaded distal end 118 of bolt 112 is threaded into a threaded bore 120 defined perpendicularly through a cylindrical spindle 122 which serves as the pivot pin for lever 108. By adjustment of bolt 112, spindle 122 is positioned relative to top extended end 114 and the opposing surface thereof against which the eccentric of lever 108 rotates. In this manner the degree of locking and tightness of lever 108 is selectively adjusted when lever 108 is rotated thereby forcing the two opposing sides of top extended end 114 of clamp 98 together. As shown in FIGS. 38 and 40 there is a relief slot 124 defined between base 104 and the circular opposing sides 99, which frees sides 99 from base 104 and allows sides 99 to be resiliently drawn by adjustment of bolt 112 into closer proximity to tighten down on tube 88, which will be disposed into clamp 98.

As shown in FIGS. 27-29 a second clamp 126 is disposed on the distal end of tube 88 and is used to tighten or lock distal extension tube 90 to tube 88, when tube 90 is telescopically disposed into tube 88. Clamp 126 is a conventional tube clamp and therefore will not be further described, but is generally similar in operation to clamp 98. Tube 88 in turn is telescopically disposed into fore-end 78.

Many alterations and modifications may be made by those having ordinary skill in the art without departing from the spirit and scope of the embodiments. Therefore, it must be understood that the illustrated embodiment has been set forth only for the purposes of example and that it should not be taken as limiting the embodiments as defined by the following embodiments and its various embodiments.

Therefore it must be understood that the illustrated embodiment has been set forth only for the purposes of example and that it should not be taken as limiting the embodiments as defined by the following claims. For example, notwithstanding the fact that the elements of a claim are set forth below in a certain combination, it must be expressly understood that the embodiments includes other combinations of fewer, more or different elements, which are disclosed in above even when not initially claimed in such combinations. A teaching that two elements are combined in a claimed combination is further to be understood as also allowing for a claimed combination in which the two elements are not combined with each other, but may be used alone or combined in other combinations. The excision of any disclosed element of the embodiments is explicitly contemplated as within the scope of the embodiments.

The words used in this specification to describe the various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, materials or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptionally equivalent, what can be obviously substituted and also what essentially incorporates the essential idea of the embodiments.

We claim:

1. An extension system for a gun support comprising:
   a fore-end integral to the stock or chassis of a gun comprising a barrel, wherein the barrel is disposed within but does not directly contact an integral bracket portion of the fore-end;
   a telescopic assembly having a proximal end and a distal end, the proximal end telescopically coupled to the fore-end, the distal end coupled to the gun support, where the telescopic assembly comprises a first telescopic portion configured to extend from the fore-end only in a parallel direction relative to the barrel; and
   a first clamp configured to selectively change a length of the first telescopic portion relative to the fore-end and to selectively change a position of the gun support coupled to a distal end of the first telescopic portion relative to the fore-end.

2. The extension system of claim 1 further comprising:
   a second telescopic portion of the telescopic assembly, which second telescopic portion is telescopically engaged with the first telescopic portion; and
   a second clamp for selectively fixing the relative position of the second telescopic portion with respect to the system.

3. The extension system of claim 1 where the first clamp is a toggle clamp and is fixed to the fore-end.

4. The extension system of claim 2 where each of the first and second clamps is a toggle clamp.

5. The extension system of claim 1 where the first and second telescopic portions are cylindrical.

6. The extension system of claim 1 where the first and second telescopic portions are hollow carbon fiber tubes.

7. The extension system of claim 1 where the gun support counter balances the barrel of the gun and maintains continuous contact with a surface on which the gun support is disposed while the gun is being fired in order to reduce the vertical movement of the barrel when the distal end of the first telescopic portion is extended from the fore-end.

8. The extension system of claim 2 where the second telescopic portion is nested within and freely rotatable relative to the first telescopic portion, and
   where the first clamp is a releasable clamp for selectively determining the position of the first telescopic portion, the relative angular orientation of the first and second telescopic portions being rotationally adjustable with respect to each other so that the gun support may be disposed on a canted surface.

9. The extension system of claim 8 further comprising a bubble level adjustably coupled to the extension system to provide an indication of horizontal alignment of the gun.

10. The extension system of claim 1 further comprising two attachment fittings for coupling two corresponding gun supports to the distal end of the telescopic assembly, the distal end of the telescopic assembly being selectively rotatable relative to the gun to selectively position one of the possible two gun supports in an operative configuration.

11. The extension system of claim 10 where the two gun supports are attached on opposing sides of the distal end of the telescopic assembly.

12. The extension system of claim 1 where the fore-end comprises at least one accessory mounting system combined therein.

13. The extension system of claim 12 where the accessory mounting system is a modular locking system (M-LOK).

14. The extension system of claim 12 where the accessory mounting system comprises an open channel adjacent to the barrel and having a plurality of bores defined therein to allow accessories to be attached thereto.

15. The extension system of claim 12 where the accessory mounting system comprises a rail defined in the fore-end.

16. The extension system of claim 12 where the fore-end comprises a prismatic multifaceted body with a corresponding plurality of longitudinal surfaces into or onto which a plurality of accessory mounting systems may be attached or mounted.

17. The extension system of claim 16 where the fore-end comprises an octagonal prismatic multifaceted body with a corresponding plurality of longitudinal surfaces into or onto which a plurality of accessory mounting systems may be attached or mounted.

18. The extension system of claim 1 further comprising a sling swivel stud mounting screw coupled to a distal end of the telescopic assembly, the gun support coupled to the distal end of the telescopic assembly by coupling to the sling swivel stud mounting screw.

19. The extension system of claim 10 where one attachment fitting for one gun support comprises a sling swivel stud mounting screw coupled to a distal end of the telescopic assembly and the other one of the two attachment fittings for one gun support comprises an accessory mounting system diametrically opposite from sling swivel stud mounting screw,
   where the gun support being coupled to a distal end of the telescopic assembly by coupling to either the sling swivel stud mounting screw or the accessory mounting system, and
   where the distal end of the telescopic assembly is rotatable to orient the sling swivel stud mounting screw or accessory mounting system into a position for coupling the sling swivel stud mounting screw or accessory mounting system to the gun support.

20. The extension system of claim 1 where the position of the gun support relative to the barrel is beneath a muzzle of the barrel or in front of the muzzle of the barrel.

* * * * *